United States Patent
Akkurt et al.

(10) Patent No.: US 9,716,749 B2
(45) Date of Patent: Jul. 25, 2017

(54) CENTRALIZED MANAGEMENT OF A P2P NETWORK

(71) Applicant: MICROSOFT TECHNOLOGY LICENSING, LLC, Redmond, WA (US)

(72) Inventors: Mehmet Akkurt, Seattle, WA (US); Alexander Burba, Seattle, WA (US); Brandon Hunt, Redmond, WA (US); Michael Gallop, Sammamish, WA (US); Nima Ganjeh, Seattle, WA (US); Frank R. Morrison, III, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 837 days.

(21) Appl. No.: 13/715,668

(22) Filed: Dec. 14, 2012

(65) Prior Publication Data
US 2014/0172971 A1   Jun. 19, 2014

(51) Int. Cl.
*G06F 15/16* (2006.01)
*H04L 29/08* (2006.01)

(52) U.S. Cl.
CPC ........ *H04L 67/104* (2013.01); *H04L 67/1029* (2013.01); *H04L 67/1034* (2013.01); *H04L 67/1063* (2013.01); *H04L 67/1085* (2013.01); *H04L 67/2814* (2013.01)

(58) Field of Classification Search
CPC ...................................................... H04L 67/104
USPC ........................................................ 709/204
See application file for complete search history.

(56) References Cited

U.S. PATENT DOCUMENTS

| | | | |
|---|---|---|---|
| 7,698,460 B2 | 4/2010 | Zhang et al. | |
| 8,086,722 B2 | 12/2011 | Bland et al. | |
| 2004/0044790 A1 | 3/2004 | Loach et al. | |
| 2004/0148424 A1 | 7/2004 | Berkson et al. | |
| 2004/0248637 A1 | 12/2004 | Liebenberg et al. | |
| 2006/0187928 A1* | 8/2006 | McGee ................. | H04L 41/082 370/390 |
| 2007/0208748 A1* | 9/2007 | Li ..................... | G06F 17/30206 |
| 2008/0310302 A1* | 12/2008 | Detwiler ............... | H04L 67/104 370/230 |
| 2009/0005057 A1 | 1/2009 | Lee et al. | |

(Continued)

OTHER PUBLICATIONS

ISA European Patent Office, International Search Report & Written Opinion of PCT/US2013/074404, Mar. 24, 2014, 9 pages.

(Continued)

*Primary Examiner* — Hamza Algibhah
(74) *Attorney, Agent, or Firm* — Alleman Hall Creasman & Tuttle LLP

(57) ABSTRACT

Telemetry data from a plurality of peer computers of a peer-to-peer network is aggregated via a computer network. Each of the plurality of peer computers sends telemetry data relating to transfer of a digital content item within the peer-to-peer network. A mitigation operation that modifies transfer of a digital content item between peer computers of the peer-to-peer network is performed according to one or more health metrics of the peer-to-peer network. The one or more health metrics are derived from the telemetry data aggregated from the plurality of peer computers.

9 Claims, 15 Drawing Sheets

(56) References Cited

U.S. PATENT DOCUMENTS

| | | | |
|---|---|---|---|
| 2009/0083362 A1* | 3/2009 | Svendsen | G06F 17/30017 709/201 |
| 2009/0288127 A1* | 11/2009 | Corson | H04H 20/08 725/110 |
| 2010/0257403 A1 | 10/2010 | Virk et al. | |
| 2010/0269044 A1 | 10/2010 | Ivanyi et al. | |
| 2010/0274765 A1 | 10/2010 | Murphy et al. | |
| 2010/0306339 A1 | 12/2010 | Ling et al. | |
| 2011/0060798 A1 | 3/2011 | Cho et al. | |
| 2011/0131278 A1* | 6/2011 | Nieh | H04L 67/104 709/204 |
| 2011/0179164 A1 | 7/2011 | Memon et al. | |
| 2011/0246658 A1* | 10/2011 | Dettori | H04L 67/1063 709/231 |
| 2011/0258309 A1* | 10/2011 | Chambers | G06F 9/5083 709/224 |
| 2012/0201158 A1 | 8/2012 | Geirhofer et al. | |
| 2012/0210014 A1* | 8/2012 | El-Beltagy | H04L 67/1044 709/231 |
| 2012/0331146 A1* | 12/2012 | Hsu | H04L 67/104 709/226 |

OTHER PUBLICATIONS

Hu, et al., "Simple Peer Selection Strategies for Fast and Fair Peer-to-Peer File Sharing", In International Conference on Advanced Communication Technology, vol. 1, Feb. 2010, pp. 208-213.

* cited by examiner

CENTRALIZED MANAGEMENT OF A P2P NETWORK

BACKGROUND

In a peer-to-peer (P2P) network, each peer computer can act as a client or a server to the other peer computers in the P2P network, allowing shared access to various resources, such as digital content items, directly between peer computers without having to direct data through a central server computer. For example, a peer computer may query other peer computers in the P2P network for availability of a digital content item, and then request the digital content item from a given peer computer that responds to the query. Typically, the peer computer may request the digital content item from the first peer computer that responds to the query or a peer computer that is immediately available to provide the digital content item regardless of a state of that peer computer, such as a location, bandwidth, throughput, connection type, or other characteristic of that peer computer. Such an uninformed selection of a content source to provide the digital content item may result in a less than optimal download experience. In other words, the peer computer may make an uninformed decision about selection of a content source when requesting a digital content item. In traditional P2P networks, the peer computer does not have information about all other peer computers in the P2P network or a mechanism to analyze such information to select a content source to provide a favorable download experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Embodiments are disclosed that relate to distributing digital content items and managing a peer-to-peer network. For example, in one embodiment, telemetry data from a plurality of peer computers of a peer-to-peer network is aggregated via a computer network. Each of the plurality of peer computers sends telemetry data related to transfer of a digital content item within the peer-to-peer network. A mitigation operation that modifies transfer of a digital content item between peer computers of the peer-to-peer network is performed according to one or more health metrics of the peer-to-peer network. The one or more health metrics are derived from the telemetry data aggregated from the plurality of peer computers.

DETAILED DESCRIPTION

The present disclosure generally relates to systems and methods for distributing digital content in a peer-to-peer (P2P) network. More particularly, the present disclosure relates to systems and methods for managing various aspects of a P2P network through a centralized management service (CMS) computer. For example, the CMS computer may monitor operations of each peer computer of the P2P network and may receive information from each peer computer in the form of telemetry data. The telemetry data may provide an individual indication of a state of a peer computer. Furthermore, the CMS computer may aggregate telemetry data from all peer computers of the P2P network to provide a holistic indication of a state of the P2P network.

The CMS computer may use the aggregated telemetry data to compute different metrics for providing operational guidance to peer computers of the P2P network. For example, the CMS computer may coordinate content source selection for acquiring a digital content item based on one or more metrics that may be derived from the aggregated telemetry data. In some cases, the CMS computer may direct such guidance toward optimizing a digital content acquisition experience of a given peer. In some cases, the CMS may direct such guidance toward optimizing operation of the P2P network as a whole. In some cases, the CMS computer may weigh the needs of an individual peer with the overall health of the P2P network when providing such guidance. By aggregating telemetry data for all peer computers in a P2P network to a CMS computer, an individual view of each peer computer, as well as holistic view of the entire P2P network may be realized. Further, this information may be leveraged to provide guidance that increases efficiency of each peer computer as well as the entire P2P network.

Figure 1:
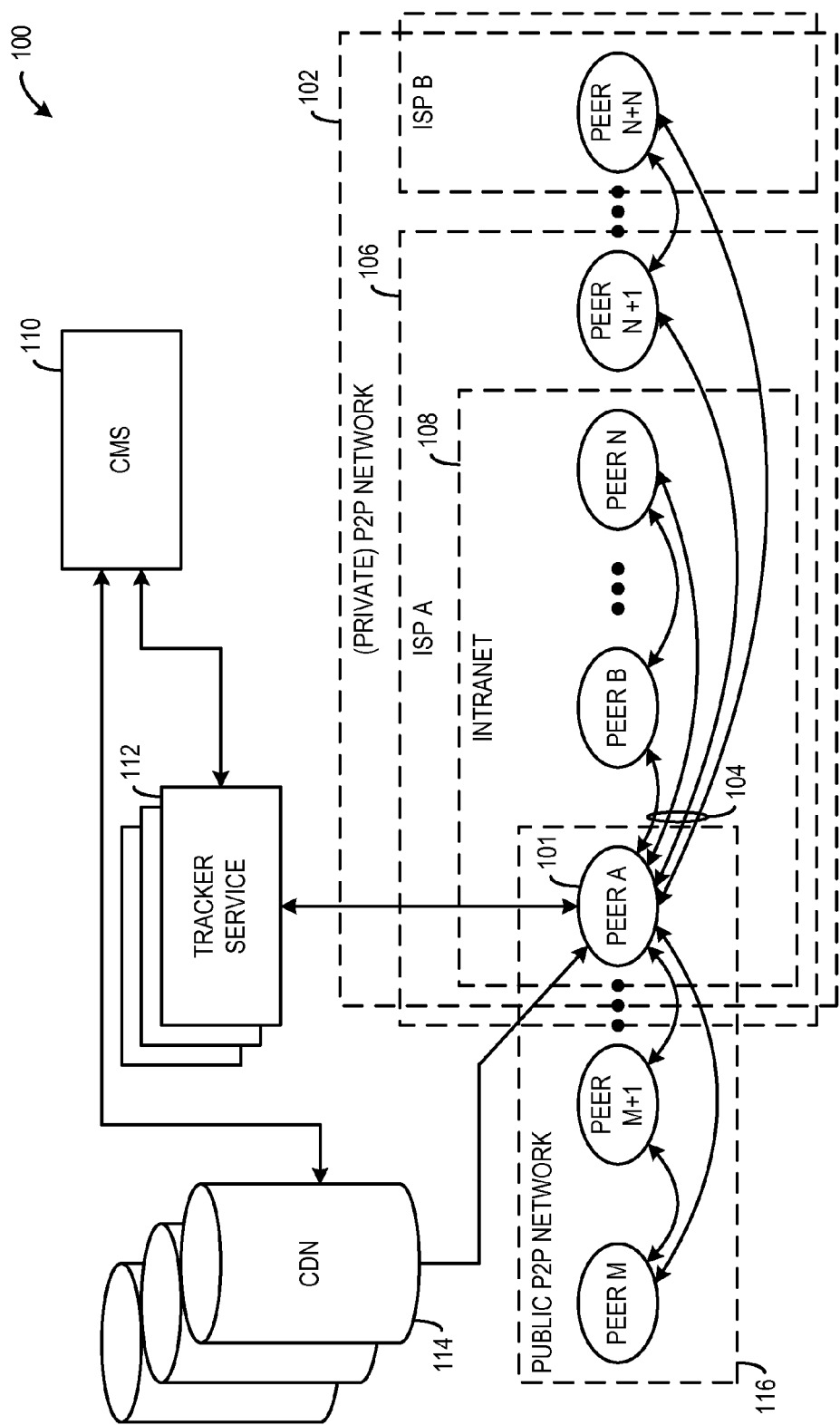
FIG. 1 shows a content distribution computing system according to an embodiment of the present disclosure.

FIG. 1 shows a content distribution system 100 according to an embodiment of the present disclosure. The content distribution system 100 comprises a P2P network 102 including a plurality of peer computers (e.g., PEER A-PEER N+N). A peer computer 101 of the P2P network 102 may have access to various local resources, such as local processing resources, locally-stored files, locally-connected peripheral machines, etc. Each peer computer of the P2P network 102 may be configured to communicate directly with each other peer computer of the P2P network via one or more computer networks 104. More particularly, each peer computer may act as a client or a server to the other peer computers of the P2P network, allowing for shared access to various local resources of each peer computer. Although it will be appreciated that any suitable resource may be transferred or shared between peer computers of the P2P network, in the context of this description, discussion may be particularly directed to transferring digital content items.

For example, the peer computer 101 may be configured to request a digital content item from any other peer computer of the P2P network. Further, the peer computer may be configured to download the digital content item from a peer computer via the computer network (a.k.a., leeching). Moreover, the peer computer may be configured to respond to a request from any other peer computer of the P2P network to provide a digital content item. Further, the peer computer may be configured to upload the digital content item to that peer computer via the computer network (a.k.a., seeding).

The computer network 104 may include one or more communication channels that allow for sharing of resources and data between computers. The computer network 104 may include any suitable transport medium, communications protocol, and organizational hierarchy for transferring data between computers. In the illustrated embodiment, for the purpose of simplicity, the computer network is indicated by a plurality of connections to the peer computer 101, although it will be appreciated that the computer network may facilitate communication between any or all of the computers of the content distribution system 100.

As part of the organization of the computer network 104, peer computers of the P2P network 102 may be associated with an internet service provider (ISP) 106. For example, the ISP may connect associated peer computers to the Internet for communication with other computers. In some embodiments, peer computers of the P2P network may be associated with different ISPs. In the illustrated example, PEER A, PEER B, PEER N, and PEER N+1 may be associated with ISP A; and PEER N+N may be associated with ISP B. Furthermore, it will be appreciated that additional unaffiliated computers that are not included in the P2P network may be associated with ISP A or ISP B.

In some cases, it may be beneficial for a peer computer to transfer a digital content item to or from a peer computer associated with the same ISP than to a peer computer associated with a different ISP. For example, transferring a digital content item between peer computers within the same ISP may increase throughput and decrease bandwidth costs relative to transferring a digital content item between peer computers associated with different ISPs. As another example, transferring a digital content item between peer computers within the same ISP may not count towards a peer computer data transfer allotment that may reduce cost for the peer computer.

In some embodiments, as part of the organization of the computer network 104, a plurality of peer computers of the P2P network 102 may be connected to an intranet network 108. Peer computers that are connected to the intranet network may transfer digital content items to other peer computers connected to the intranet network without interfacing with an external network, such as the Internet.

In some cases, it may be beneficial for a peer computer to transfer a digital content item to or from a peer computer connected to an intranet network than to transfer a digital content item to a peer computer that is not connected to the intranet network or is located external to the intranet network. For example, transferring a digital content item between peer computers connected to an intranet network may increase throughput and decrease bandwidth costs relative to transferring a digital content item to a peer computer that is external to the intranet network because data transferred to an external peer computer would have to flow through a gateway or other interface to reach the externally located peer computer.

The content distribution system 100 may include a CMS computer 110 configured to manage operation of the P2P network 102 based on telemetry data aggregated from peer computers of the P2P network. For example, telemetry data may pertain to interactions between peer computers of the P2P network, such as relating to transfer of a digital content item.

The CMS computer 110 may optionally include a tracker service computer 112 configured to track peer computers in the P2P network 102. In particular, peer computers may report information in the form of telemetry data to the tracker service computer, and in exchange, the peer computers may receive information about other peer computers to which they can connect. For example, the peer computer 101 may send telemetry data related to transfer of a digital content item to the tracker service computer 112 via the computer network 104. For example, the peer computer may send the telemetry data when intending to transfer a digital content item, after transferring a digital content item, or attempting to transfer a digital content item. It will be appreciated that a peer computer may send telemetry data to the tracker servicer or the CMS computer at any suitable time. Moreover, the operation of sending telemetry data may be decoupled from actual transfer of a digital content item. In one example, the CMS computer may be configured to aggregate the telemetry data from the peer computers of the P2P network in real-time or close to real-time via the tracker service computer.

In some embodiments, the tracker service computer 112 may include a plurality of tracker service computers that may track telemetry data for different peer computers of the P2P network 102. For example, different tracker service computers may track peer computers in different regions (e.g., geographical regions) of the P2P network, peer computers belonging to different ISPs, or the like. Each of the plurality of tracker service computers may send telemetry data to the CMS computer for aggregation.

The plurality of tracker service computers may provide redundancy and flexibility for tracking peer computers in the P2P network. In some embodiments, the CMS computer 110 may be configured to adjust which tracker service computers track which peer computers in order to provide load balancing capabilities in order to efficiently track peer computers across the P2P network. For example, if a significant number of peer computers in a first region of the P2P network are sitting idle, while a significant number of peer computers in a second region of the P2P network are transferring digital content items such that throughput of telemetry data sent to the tracker service computers of the second region is reduced, then the CMS computer may be configured to identify the reduction in throughput and responsively shift resources of tracker service computers assigned to the first region to track peer computers of the second region in order to increase throughput of telemetry data of the second region. In the illustrated embodiment, for the purpose of simplicity, the tracker service computer 112 is connected to the peer computer 101, although it will be appreciated that the tracker service computer may connect to any or all peer computers of the P2P network 102. In some embodiments, the tracker service computer may be integrated with the CMS computer. In some embodiments, telemetry data may bypass the tracker service, and may be fed directly to the CMS computer. In this case, the tracker service may then either be pushed, or may pull telemetry data from the CMS computer. In some embodiments, the tracker service may be omitted.

The CMS computer 110 may be configured to use the feedback of the aggregated telemetry data to monitor operation of each peer computer as well as to monitor operation of a part or whole of the P2P network 102. Further, the CMS computer may be configured to compute or derive various metrics to quantify a state of operation of a peer computer or a state of operation of the P2P network from the aggregated telemetry data. The CMS computer may be configured to perform various management operations based on the metrics to increase efficiency of operation or otherwise improve the health of a peer computer or the P2P network. Non-limiting examples of management operations include selecting a content-delivery source for a peer computer, matching peer computers for transfer of a digital content item, performing mitigation operations that modify transfer of a digital content item, quarantining a peer computer from transferring a digital content item, rewarding a peer computer for participation with the P2P network, commanding obligatory transfer of a digital content item between peer computers of the P2P network, publishing a digital content item, and validating a digital content item. Management operations performed by the CMS computer will be discussed in further detail below with reference to FIG. 3.

In some embodiments, the content distribution system 100 may include a content-delivery network (CDN) computer 114 that may act as a data source to support and/or supplement the P2P network 102. The CDN computer may be configured to store some or all of the digital content items available for transfer on peer computers of the P2P network. In other words, the CDN computer may act as a mirror or backup to the P2P network. In the illustrated embodiment, for the purpose of simplicity, the CDN computer 114 is connected to the peer computer 101, although it will be appreciated that the CDN computer may connect to any or all peer computers of the P2P network 102.

In some cases, the CDN computer 114 may be an additional source to seed digital content items. For example, the P2P network may often provide high content acquisition speeds due to the large number of peer computers sharing content. However, if a digital content item is rare in the P2P network, a content acquisition time may increase significantly. The CDN computer may provide the rare digital content item in order to reduce the content acquisition time of the digital content item in the P2P network. Moreover, in some cases, the CDN computer may provide a guarantee that all digital content items mirrored in the P2P network are available regardless of peer participation as seeders.

Furthermore, in some cases, the CDN computer 114 may be a source of digital content items that are not yet available for transfer on the P2P network. For example, when a new digital content item is created, that digital content item may be initially introduced to the P2P network by the CDN computer.

In some embodiments, the CDN computer 114 may include a plurality of server computers that may provide digital content items to different peer computers of the P2P network 102. For example, different CDN server computers may provide digital content items to peer computers in different regions (e.g., geographical regions) of the P2P network, peer computers belonging to different ISPs, or the like. In some embodiments, the CDN computer may be integrated with the CMS computer.

The CMS computer 110 may be configured to recommend that a peer computer of the P2P network 102 acquire a digital content item from a recommended content source, such as either a peer computer or the CDN computer based on one or more metrics derived from the aggregated telemetry data. In some cases, the CMS computer may be configured to select a source for content delivery based on a type of content being delivered. For example, a digital content item may not be amenable for P2P sharing, and the CMS computer may instruct peer computers to acquire that digital content item directly from the CDN computer as opposed to a peer computer. In one particular example, if a given digital content item in the P2P network is compromised, the CMS computer may be configured to instruct all peer computers that only the CDN computer is an acceptable content-delivery source for the given digital content item. By implementing a CDN computer that may increase the likelihood of content availability, and overlaying a P2P network that allows peer computers to benefit from many content-delivery sources, CDN costs may be mitigated, a digital content item acquisition experience may be made closer to guaranteed, and peer throughput may be increased.

In some embodiments, each peer computer of the P2P network 102 may be configured to follow a priority protocol when acquiring a digital content item. For example, a peer computer may first send to the CMS computer 110 via the computer network 104 a content-acquisition request. The content-acquisition request may query the CMS computer for one or more recommended content sources to provide a digital content item. If the peer computer does not receive a response to the content-acquisition request from the CMS computer in a suitable period, then the peer computer may be configured to automatically send to the CDN computer via the computer network a fallback request to download the digital content item. In some embodiments, the peer computer may include logic to determine when to make the fallback request. For example, the fallback request may be sent automatically to the CDN computer if a response to the content-acquisition request is not received and a condition is satisfied. For example, the condition may include not receiving a response to the content-acquisition request within a designated response time limit, not beginning to download the digital content item within a designated download-commencement time limit, not completing download of the digital content item within a designated download-completion time limit, not downloading the digital content item above a threshold throughput, or not downloading the digital content item above a threshold throughput during a download testing period. If the CDN does not respond to the request, then the peer computer may be configured to send a request to a given peer that may not necessarily be a best match or may be arbitrarily selected. By following the above described communication protocol, peer computers of the P2P network may be provided with an acceptable content acquisition experience even if the CMS computer is unavailable to provide an intelligent recommendation for a content-delivery source.

In some embodiments, the peer computer 101 may follow a source selection protocol that includes local and remote sources when attempting to acquire a digital content item. For example, the peer computer may be configured to identify a plurality of sources storing portions of a digital content item having a plurality of pieces. The sources may include local storage machines (e.g., optical disc, steady-state storage, local network storage, etc.) and other peer computers of the P2P network. For the local storage machines, the peer computer may scan each local storage machine for portions of the digital content item. For the other peer computers, the peer computer may query the CMS computer to identify peer computers having a portion of the digital content item. Further, the peer computer may be configured to, for each piece of the digital content item, select a source based on one or more download metrics, and download that piece from the selected source. For example, the download metrics may include a fastest download speed, a lowest acquisition cost, a lowest resource usage level, a lowest energy usage level, a lowest user experience disruption level, an availability of a resource, any other suitable constraint, and/or other suitable metrics. Further, in some cases, the download metric may select the one or more local storage machines over the P2P network when possible to download a piece of the digital content item. The peer computer may be configured to organize the downloaded pieces for installation on the peer computer as the digital content item.

In some embodiments, the CMS computer 110 may command peer computers of the P2P network 102 to act as distribution hubs or virtual CDNs that acquire specific digital content items for distribution. For example, the CMS computer may be configured to command a peer computer to acquire a digital content item, and then direct other peer computers to that peer computer to acquire the digital content item. Further, the CMS computer may be configured to command the peer computer to delete the digital content item. In some embodiments, the CMS computer may be configured to control a plurality of peer computers setup as distribution hubs throughout the P2P network 102 (e.g., in different regions) to facilitate the availability of digital content items that may be quickly acquired throughout the P2P network.

In some embodiments, a peer computer that is setup as a distribution hub may include a local storage machine that is partitioned into a user-controlled portion and a service-controlled portion. Digital content items that may be acquired voluntarily (or actively) may be stored in the user-controlled portion of the local storage machine. Digital content items acquired obligatorily (or passively) based on a command from the CMS computer may be stored in the service-controlled portion of the local storage machine. Generally, the peer computers of the P2P network may operate according to a PULL strategy for sharing digital content items. In particular, a peer computer requests a source to provide a digital content item in order for that peer computer to receive the digital content item. According to the PULL strategy, the CMS computer may command a peer computer to send a request to a peer computer acting as a virtual distribution hub to provide a digital content item in order for the digital content item to be distributed to the requesting peer computer. Likewise, the CMS computer may command the peer computer acting as the virtual distribution hub to send a request to provide a digital content item to another peer computer in order for the peer computer acting as a virtual distribution hub to receive the digital content item. Furthermore, in some embodiments, peer computers may further operate according to a PUSH strategy for sharing digital content items. For example, the CMS computer may command a peer computer to upload a digital content item to another designated peer computer in order to distribute the digital content item.

In some embodiments, the P2P network 102 may be a private or restricted P2P network in which participation by a peer computer may be controlled through an authentication, membership, or affiliation process that is performed by the CMS computer 110. Further, peer computers of the private P2P network may store and transfer curated digital content items that are associated with the private P2P network. Curated digital content items may be digital content items that are verified by the CMS computer as being suitable for distribution throughout the private P2P network. For example, a curated digital content item may be verified by the CMS computer as having a compatible format, or abiding by a set of rules of the private P2P network. In one example, the CMS computer verifies a curated digital content item by comparing a unique identifier of a given digital content item with a certified record of a unique identifier of a curated digital content item. In some embodiments, a curated digital content item may be digitally encrypted such that the digital content item may only be utilized with an appropriate decryption key of the private P2P network or may only be accessed by peer computers of the private P2P network.

In some embodiments, the private P2P network 102 may be associated with a particular type of computer. For example, the private P2P network may be associated with a game console, and access to the private P2P network may be only available through the game console. This type of restriction may limit content acquisition speeds to the connection speed of the game console. In this example, curated digital content may include games, game updates, downloadable content, or operating system updates associated with the game console. Such curated content may be published by a manufacturer of the game console or a third-party for distribution throughout the private P2P network.

In some cases, a curated digital content item may enter the private P2P network 102 through a peer computer voluntarily acquiring the curated digital content item from the CDN computer 114 or another external or unaffiliated computer. In some cases, a curated digital content item may be published by the CMS computer for distribution throughout the private P2P network, such as through a purposeful, controlled rollout to a peer computer that obligatorily seeds the curated digital content item to other peer computers. Under some conditions, it may be difficult to quickly seed a curated digital content item into the private P2P network in terms of time and cost. For example, it may take a significant amount of time for a curated digital content item to be downloaded by enough peer computers such that an availability of the curated digital content item is high enough that a peer computer requesting the curated digital content item can acquire it without waiting in a queue. Moreover, purposeful seeding coordinated by the CMS computer may use resources of the P2P network.

Accordingly, in some embodiments, the CMS computer 110 may be configured to publish to a public P2P network 116 a curated digital content item intended for use in the private P2P network 102. The public P2P network may include a plurality of peer computers configured to transfer digital content items directly to other peer computers of the public P2P network. The public P2P network may differ from the private P2P network in that a peer computer may participate in the public P2P network without an authentication, membership, or affiliation process. Typically, the public P2P network may be larger and more varied (e.g., different types of computers) than the private P2P network. Although it will be appreciated that the private P2P network and the public P2P network may include any suitable number of peer computers. Furthermore, peer computers of the public P2P network may transfer digital content items that are not curated by the CMS computer in addition to curated digital content items. Digital content items that are not curated may be transferred between peer computers without validation.

The curated digital content item may be voluntarily distributed to peer computers throughout the public P2P network 116. Since there are no restrictions to participation in the public P2P network, a peer computer of the private P2P network 102 may acquire the curated digital content item from a peer computer of the public P2P computer. In response to acquiring the curated digital content item, the peer computer of the private P2P network send a report to the CMS computer 110 indicating the peer computer has acquired the curated digital content item, and the CMS computer may validate the curated digital content item. In response to successful validation of the curated digital content item by the CMS computer, the curated digital content item may be made available by the CMS computer for transfer within the private P2P network.

In some embodiments, the CMS computer 110 may be configured to identify an unaffiliated peer computer that has acquired the curated digital content item from the public P2P network 116. An unaffiliated peer computer may be a peer computer that is not affiliated with the private P2P network. The CMS computer may be further configured to send to a peer computer of the private P2P network 102 that does not have the curated digital content item a command to download the curated digital content from the unaffiliated peer computer in order to further seed the curated digital content item into the private P2P network.

By publishing a curated digital content item to the public P2P network, any available peer computer can be used, independent of authentication, membership, affiliation, location, device, etc. to seed the curated digital content item. In this way, an availability of the digital content item may be increased quickly without using resources of the private P2P network. Moreover, since the public P2P network has no restrictions, a peer computer of the private P2P network may download the curated digital content item from various sources of the public P2P network.

Furthermore, in some embodiments, the CMS computer 110 may be configured to pre-seed the curated digital content item by publishing the curated digital content item to the public P2P network 116 before the curated digital content item is made available to the private P2P network 102. In this way, the curated digital content item may be available on supplemental peer computers for seeding upon rollout of the curated digital content item to the private P2P network.

In the illustrated embodiment, the peer computer 101 is shown as a member of both the public P2P network 116 and the private P2P network 102. However it will be appreciated that all peer computers of the public P2P network need not directly connect with all peer computers of the private P2P network. Furthermore, although not shown, it will be appreciated that other peer computers may be a member of both the public P2P network 116 and the private P2P network 102

Figure 2:
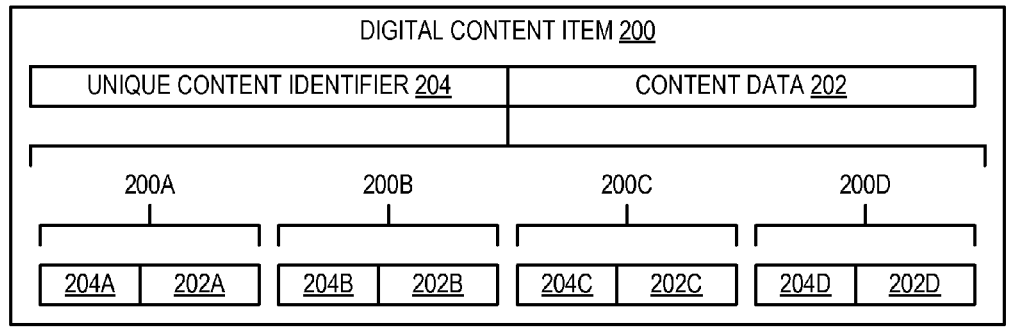
FIG. 2 shows a digital content item according to an embodiment of the present disclosure.

FIG. 2 shows a digital content item 200 according to an embodiment of the present disclosure. The digital content item 200 may include content data 202 and a unique content identifier 204 that identifies the content data 202.

In some embodiments, the unique content identifier 204 may include a digital rights management protection mechanism, such as a digital encryption code. Further, different computers in the content distribution system may have an appropriate decryption key to access the content data 202. In one example, peer computers of a private P2P network may hold an appropriate decryption key to access or use a digital content item, and unaffiliated peer computers may not hold the appropriate decryption key, and thus cannot access the digital content item. In another example, the CMS computer may hold an appropriate decryption key to access a digital content item, and peer computers designated a virtual distribution hubs may not hold the appropriate decryption key, and thus cannot access the digital content item. It is to be understood that any suitable digital rights protection paradigm may be implemented to protect access to a digital content item without departing from the scope of the present disclosure.

In some cases, the digital content item 200 may include a plurality of pieces 200A-200D. In the depicted example, each piece may include a piece of content data and a unique identifier. The content data 202 may include content data pieces 202A-202D. Each piece may optionally be packaged with a unique content identifier, which may optionally include, as a supplement to the identifier that identifies the digital content item as a whole, an identifier that further identifies that particular piece (e.g., unique content identifiers 204A-204D). As another example, each piece may have a separate unique identifier.

Any or all of the pieces of the digital content item 200 may be available for transfer between peer computers (or another source) of the P2P network. In other words, when downloading a particular content item, a peer computer may receive different pieces of the digital content item from different sources. The digital content item 200 may be downloaded as separate pieces in parallel and/or series from the same or different content sources. The pieces 200A-200D collectively constitute the content data 202 and may be reassembled during and/or after downloading to form the digital content item 200. While four pieces are shown in the illustrated example, it is to be understood that the content data of the digital content item may be parsed into any number of portions according to a variety of different constraints. In some examples, each portion may be the same size, while in other examples some portions may be sized differently than other portions. In either case, each piece may be packaged with a self-identifying element that self reports the size of that piece. Such a self-identifying element may optionally be incorporated into a content identifier in some embodiments.

It will be appreciated that the term "digital content item" as used herein may refer to any single piece of the digital content item, a plurality of pieces of the digital content item that constitute a portion but not all of the digital content item, or the digital content item in its entirety. For example, transferring a digital content item may refer to transferring only a piece of the digital content item or to transferring the digital content item in its entirety.

Figure 3:
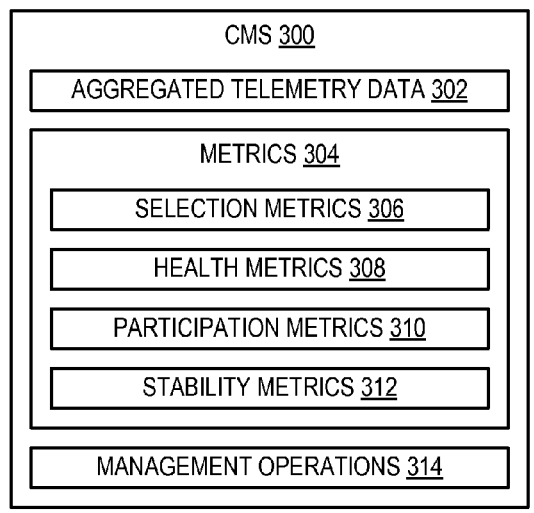
FIG. 3 shows a centralized management service (CMS) computer architecture according to an embodiment of the present disclosure.

FIG. 3 shows a software architecture diagram of a CMS computer 300 according to an embodiment of the present disclosure. For example, the CMS computer 300 may be employed as the CMS computer 110 in the content distribution system 100 shown in FIG. 1. The CMS computer 300 may include aggregated telemetry data 302 from a plurality of peer computers of a P2P network, a plurality of metrics 304 derived from the aggregated telemetry data, and a plurality of management operations 314 that may be performed according to one or more of the plurality of metrics.

The aggregated telemetry data 302 may provide information about an individual peer computer of the P2P network. For example, a peer computer may report telemetry data to the CMS computer 300 including an identifier of the peer computer, an intranet network identifier, an associated ISP, an associated location or region, network type, as well as other information about the location and connection of the peer computer. More particularly, the aggregated telemetry data may include information about policies of ISPs of peer computers of the P2P network or other unaffiliated peer computers, such as bandwidth ranges for download and upload, bit-caps, operating country, etc. Further, the telemetry data of the peer computer may include locally-accessible processing resources, locally-accessible peripheral machines, locally-accessible storage machines, a list of locally-hosted digital content items, and other identifying information of the peer computer.

Moreover, the telemetry data may provide information about actions of the peer computer. For example, a peer computer may report telemetry data to the CMS computer after transferring a digital content item or attempting to transfer a digital content item. The telemetry data related to downloading may include what digital content items have been downloaded or are in the process of downloading, and from which source. Telemetry data related to uploading may include which digital content items have been uploaded or are in the process of being uploaded, and to which recipient. Telemetry data may further include timestamps of such events including start and stop times, a current throughput, a current bandwidth, a current latency, a current availability, a current congestion rate, transfer errors, and other information describing current actions of the peer computer. In some embodiments telemetry data may include participation statistics that track leeching and seeding. In some embodiments, participation statistics may be tracked by content categories (e.g., content type, title, genre, etc.).

Additionally, a peer computer may report information about another peer computer to the CMS computer 300. The information may be generated from interactions with the other peer computer. For example, a peer computer may report to the CMS computer an availability of the other peer computer or that the other peer computer is unresponsive. Further, a peer computer may report to the CMS computer an upload throughput or transfer rate of the other peer computer. As another example, a peer computer may report to the CMS computer that a peer computer has returned a piece of digital content that does not match a digital signature or a unique identifier of a requested digital content item. As yet another example, a peer computer may report to the CMS computer that the other peer computer repeatedly disconnects during transfer of a digital content item.

The CMS computer may aggregate telemetry data for a P2P computer over time to formulate historical data for the peer computer. For example the aggregated telemetry data may include historical usage patterns, historical availability, historical throughput, historical bandwidth, historical latency, historical congestion rate, historical transfer errors, and other information describing previous actions of the peer computer. In some cases, the historical data may be used by the CMS computer to forecast future actions of a peer computer.

Furthermore, the aggregated telemetry data 302 may provide information about a part or a whole of the P2P network. For example, the aggregated telemetry data may include a list indicating which peer computers have which digital content items, an availability of each digital content item (e.g., most rare, least rare), a download frequency of each digital content item (e.g., most downloaded), a current throughput of a part or whole of the P2P network, a current bandwidth of a part or whole of the P2P network, a current latency of a part or whole of the P2P network, a current availability of peers in a region, and other global information about a part or whole of the P2P network.

The CMS computer may aggregate telemetry data for the P2P network over time to formulate historical data for the P2P network. For example the aggregated telemetry data may include historical usage patterns of a part or whole of the P2P network, historical availability of a part or whole of the P2P network, historical throughput of a part or whole of the P2P network, historical bandwidth of a part or whole of the P2P network, historical latency of a part or whole of the P2P network, a historical congestion rate of a part or whole of the P2P network, historical transfer errors of a part or whole of the P2P network, and other information describing previous actions of a part or whole of the P2P network.

The CMS computer 300 may include a plurality of metrics 304 that may be derived from the aggregated telemetry data 302. Each of the plurality of metrics 304 may quantify a state of operation of a peer computer or a state of operation of a part or whole the P2P network. The CMS computer may use one or more of the metrics to evaluate whether to perform management operations 314. In some cases, the CMS computer may weight one or more metrics against one or more other metrics to determine whether or not to perform a management operation, or to determine which management operation to perform. It is to be understood that not all telemetry data used to make decisions in the metric need be reported. In some cases, telemetry data may be derived from reported telemetry data or acquired independent of reporting. The plurality of metrics 304 may include selection metrics 306, health metrics 308, participation metrics 310, and stability metrics 312.

The CMS computer 300 may be configured to apply one or more selection metrics 306 to match peer computers for transfer of a digital content item. In other words, the CMS computer may be configured to identify a peer computer of the P2P network as a recommended content source according to one or more selection metrics. Furthermore, the CMS computer 300 may be configured to select the CDN computer as a recommended content source according to the selection metrics. It will be appreciated that the CMS computer may select any suitable number of sources as recommended content sources when responding to a content-acquisition request. For example, the CMS computer may send a response that includes a plurality of recommended sources ordered according to matching criteria of the requesting peer computer or the P2P network. Each of the plurality of recommended sources may have a part or all of a digital content item. In some cases, the order in which the sources are recommended may depend on which portion or how much of a digital content item that source may have.

In some cases, the selection metrics may be directed towards the interests or health of a peer computer. For example, the selection metrics may determine which available peer computer may provide a digital content item in the least costly manner. The cost may be calculated in terms of money, time, resources, energy consumption, user experience, etc. In some embodiments, such different types of costs may be ranked according to user preference as part of a selection metric. In some embodiments, a selection metric may consider a plurality of cost factors that are weighted in a selection function that identifies a most suitable peer computer as a recommended content source. As another example, the selection metrics may determine which available peer computer may provide a digital content item in a most reliable manner based on stability metrics that are described in further detail below.

In some cases, the selection metrics may be directed towards the interests or health of a part or whole of the P2P network. For example, the selection metrics may select a peer computer as a recommended content source to manage throughput in a part of the P2P network (e.g., to reduce hotspots in the P2P network). Additional selection metrics may include health metrics that are described in further detail below.

Various examples of selection metrics are described herein. In some embodiments, a peer selection metric may select a peer computer that has a digital content item as the recommended content source based on current bandwidths of available peer computers. For example, the peer computer being currently available to upload the digital content item and having a highest current bandwidth of available peer computers may be identified as the recommended content source.

In some embodiments, a peer selection metric selects a peer computer that has a digital content item as the recommended content source based on current latencies of available peer computers. For example, the peer computer being currently available to upload the digital content item and having a lowest current latency of available peer computers may be identified as the recommended content source.

In some embodiments, a peer selection metric selects a peer computer that has a digital content item as the recommended content source based on historical bandwidths. For example, the peer computer being currently available to upload the digital content item and having a highest historical bandwidth of available peer computers may be identified as the recommended content source.

In some embodiments, a peer selection metric selects a peer computer that has a digital content item as the recommended content source based on historical latencies. For example, the peer computer being currently available to upload the digital content item and having a lowest historical latency of available peer computers may be identified as the recommended content source.

In some embodiments, a peer selection metric selects a peer computer that has a digital content item as the recommended content source based on historical usage patterns. For example, the peer computer being currently available to upload the digital content item and having a historical usage pattern indicating that the peer computer is available to upload the first digital content item may be identified as the recommended content source.

In some embodiments, a peer selection metric selects a peer computer that has a digital content item as the recommended content source based on an ISP. For example, the peer computer sharing an ISP with a requesting peer computer may be identified as the recommended content source.

In some embodiments, a peer selection metric selects a peer computer that has a digital content item as the recommended content source based on an intranet network. For example, the peer computer being connected to an intranet network to which a requesting peer computer is connected may be identified as the recommended content source.

In some embodiments, various selection metrics or matching criteria may be weighted in a selection formula to identify one or more recommended sources to provide part or all of a digital content item. Moreover, any suitable number of sources may be weighted according to the selection formula and recommended to a requesting peer computer. It is to be understood that any suitable formula, algorithm, heuristics, fuzzy or other logic may be applied to make an informed decision to select one or more recommended sources to provide a digital content item.

The CMS computer 300 may be configured to apply one or more health metrics 308 to determine whether to perform mitigation operations that modify transfer of a digital content item between peer computers of the P2P network in order to increase efficiency, stability, or general health of a peer computer or a part or whole of the P2P network. Furthermore, the health metrics may be applied as part of the selection process for peer matching.

Various examples of selection metrics and corresponding mitigation operations are described herein. In some embodiments, a health metric may include a threshold number of peer computers requesting a digital content item from a designated peer computer, and the mitigation operation may include redirecting one or more peer computers requesting the digital content item from the designated peer computer to request the digital content item from a different peer computer in order to reduce a number of requesting peer computers of the designated peer computer below the threshold number.

In some embodiments, a health metric may include a threshold throughput of a region of the P2P network, and the mitigation operation may include redirecting one or more peer computers requesting a digital content item from one or more peer computers in the region to request the digital content item from a different peer computer outside of the region in order to increase a throughput of the region above the threshold throughput.

In some embodiments, a health metric may include a threshold difference between a number of uploads and a number of downloads of a peer computer of the P2P network, and the mitigation operation may include reducing the number of downloads in order to increase a difference between a number of uploads and a number of downloads of the peer computer above the threshold difference.

In some embodiments, a health metric may include a threshold availability of a digital content item and the mitigation operation may include commanding one or more peer computers having the digital content item to upload the digital content item to one or more other peer computers in the P2P network in order to increase an availability of the digital content item above the threshold availability. In embodiments that employ a PULL transfer strategy, the CMS computer may command a peer computer to send to the peer computer having the digital content item a request to provide the digital content item to the requesting peer computer in order to increase the availability of the digital content item.

In some embodiments, the CMS computer may use the health metrics to identify peer computers that may be malicious or are otherwise hindering operation of the P2P network, so that the CMS computer may perform mitigation operations to handle the malicious peer computer, such as quarantining the malicious peer computer from transferring a digital content item.

Various examples of health metrics that result in quarantine are described herein. In some embodiments, a health metric may include a peer computer being unavailable to transfer a digital content item within the P2P network, and the CMS computer quarantines the designated peer computer for being unavailable.

In some embodiments, a health metric may include a threshold data upload rate, and the CMS computer quarantines the designated peer computer for having a data upload rate that is lower than the threshold data upload rate.

In some embodiments, a health metric may include a digital signature of a requested digital content item matching a digital signature of a received digital content item, and the CMS computer quarantines the designated peer computer for uploading a digital content item having a digital signature that does not match a digital signature of a requested digital content item.

In some embodiments, a health metric may include a threshold number of times that a peer computer is disconnected while uploading a digital content item, and the CMS computer quarantines the designated peer computer for being disconnected a number of times greater than the threshold number of times while uploading a digital content item.

The CMS computer 300 may be configured to apply one or more participation metrics 310 to determine a level of participation of peer computers in the P2P network. The participation metrics may be used to provide a reward to peer computers in order to incentivize participation in the P2P network. Rewards can be used to entice users to continue sharing a digital content item even after they have acquired the digital content item, and possibly even post consumption. For example, a participation metric may track a number of pieces of a digital content item uploaded to other peer computers in the P2P network by a peer computer, a number of bytes uploaded to other peer computers in the P2P network by a peer computer, a total amount of time spent uploading to other peer computers in the P2P network by a peer computer, a longest session spent uploading to other peer computers in the P2P network by a peer computer, a longest amount of time spent available for uploading to other peer computers in the peer-to-peer network, a total amount of time spent available for uploading to other peer computers in the peer-to-peer network, a number of times a piece of a digital content item is uploaded to other peer computers in the P2P network by a peer computer, a number of times an entire digital content item is uploaded to other peer computers in the P2P network by a peer computer, and/or other suitable metrics.

The CMS computer 300 may be configured to apply one or more stability metrics 312 to determine whether a peer computer is stable enough to suitably transfer a digital content item. In some cases, the CMS computer may apply a stability metric as part of a peer computer selection process. In some cases, the CMS computer may apply a stability metric during transfer of a digital content item to dynamically determine whether a current content source is the most suitable content source. For example, a stability metric may include a threshold download speed, a threshold resource level, a threshold number of connectivity interruptions, a threshold cost, a threshold user experience disruption level, a threshold bandwidth, and/or other suitable metrics. Additional stability metrics may include a peer computer not having a requested digital content item, a peer computer no longer being available (e.g., the device is shutdown), a peer computer no longer participating in the P2P network, and a peer computer refusing to accept connection with a requesting peer computer.

The CMS computer 300 may be configured to perform one or more management operations 316 according to the above described metrics. Non-limiting examples of management operations associated with the selection metrics 306 may include recommending a peer as a content source and recommending a source other than a peer computer as a content source (e.g., a CDN computer). Non-limiting examples of management operations associated with the health metrics 308 may include the above described mitigation operations. Non-limiting examples of management operations associated with the participation metrics 310 may include providing a reward and providing a participation rank of peer computers of the P2P network. Non-limiting examples of management operations associated with the stability metrics 312 may include recommending a most stable content source and dynamically recommending a different content source that is more stable based on an updated evaluation of stability.

It will be appreciated that the CMS computer may be configured to continuously apply one or more of the metrics described above to re-evaluate the current state of a peer computer or a part or whole of the P2P network. In some cases, the re-evaluation process may be based on feedback from updated telemetry data aggregated from peer computers. Further, the CMS computer may be configured to dynamically perform management operations based on the updated feedback to continuously enhance operation of the P2P network.

It will be appreciated that the configurations described above may enable various methods related to operation of a peer computer in a P2P network as well as management of a content distribution system including a P2P network. Accordingly, some such methods are now described, by way of example, with continued reference to the above configurations. It will be appreciated, however, that these methods, and others fully within the scope of the present disclosure, may be enabled via other configurations as well.

Figure 4:
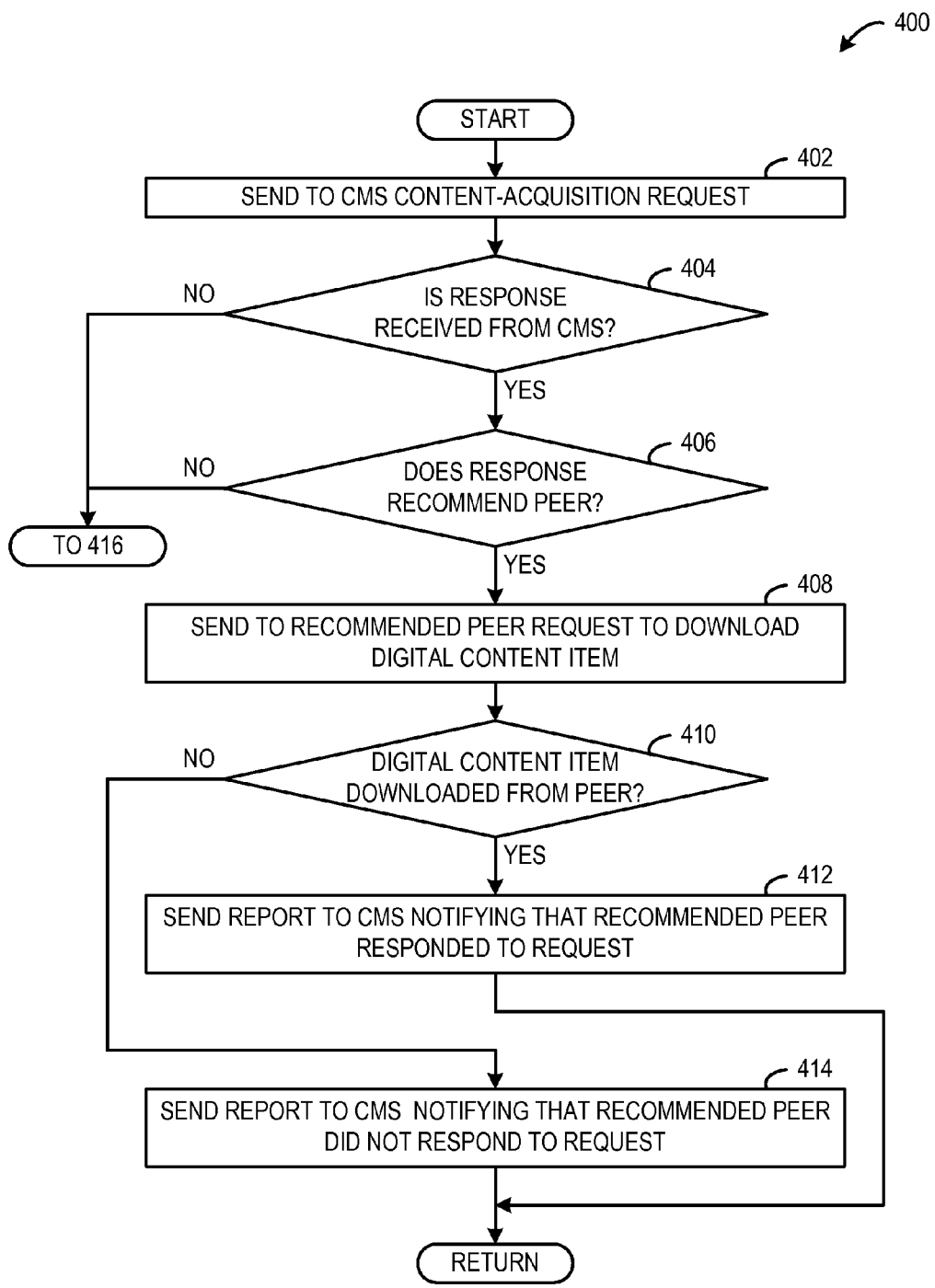
FIGS. 4 and 5 show a method for acquiring a digital content item according to an embodiment of the present disclosure.
Figure 5:
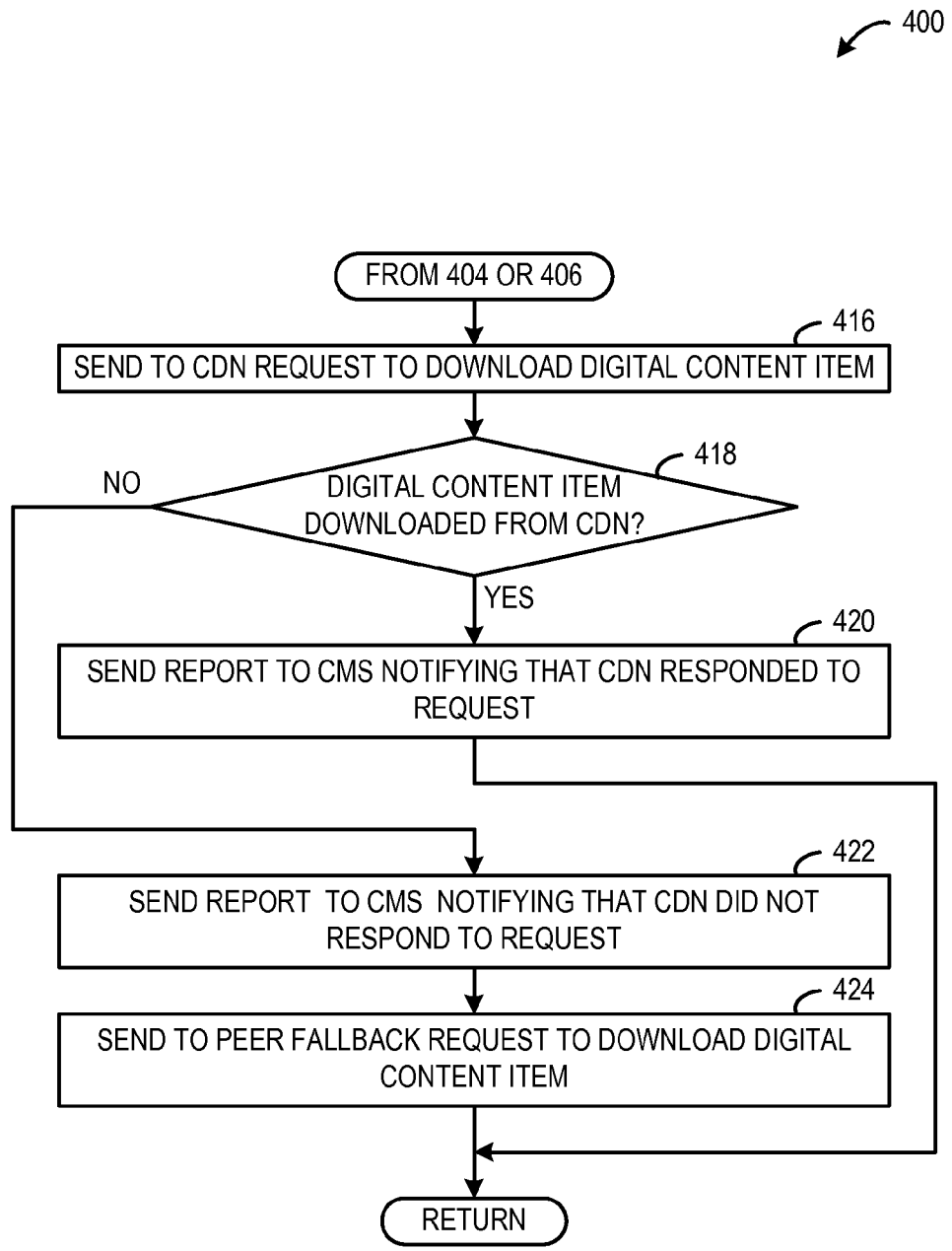

FIGS. 4 and 5 show a method 400 for acquiring a digital content item according to an embodiment of the present disclosure. For example, the method 400 may be performed by a peer computer of a P2P network, such as the peer computer 101 of the P2P network 102 shown in FIG. 1. At 402, the method 400 may include sending to a CMS computer via a computer network a content-acquisition request. The content-acquisition request may query the CMS computer for a recommended content source to provide a digital content item.

At 404, the method 400 may include determining whether a response to the content-acquisition request is received from the CMS computer via the computer network. If a response is received the method 400 moves to 406. Otherwise, the method 400 moves to 416.

At 406, the method 400 may include determining whether the response to the content-acquisition request includes a recommended peer computer of the P2P network. If the response includes the recommended peer, then the method 400 moves to 408. Otherwise, the method 400 moves to 416.

At 408, the method 400 may include sending to the recommended peer computer via the computer network a request to download the digital content item.

At 410, the method 400 may include determining whether the digital content item was downloaded from the recommended peer computer. If the digital content item was downloaded from the recommended peer computer, then the method 400 moves to 412. Otherwise, the method 400 moves to 414.

At 412, the method 400 includes sending to the CMS computer via the computer network a report indicating that the recommended peer computer did respond to the request to download the digital content item, and the digital content item was successfully downloaded. The report may include telemetry data associated with the requesting peer computer as well as telemetry data associated with the recommended peer computer.

At 414, the method 400 may include sending to the CMS computer via the computer network a report indicating that the recommended peer computer did not respond to the request to download the digital content item. The report may include telemetry data associated with the requesting peer computer and the recommended peer computer (e.g., an indication that the recommended peer did not respond to the request).

At 416, the method 400 may include sending to a CDN computer via the computer network a request to download the digital content item. If a response to the content-acquisition request is received from the CMS computer (e.g., as illustrated by "NO" branch at 406 of FIG. 4), and identifies the CDN computer as the recommended content source, then the CMS computer has identified the CDN computer as the most suitable source to provide the digital content item based on one or more metrics as described above. If a response to the content-acquisition request is not received from the CMS computer (e.g., as illustrated by "NO" branch at 404 of FIG. 4), then the request may be a first fallback request that is sent automatically. In other words, the CDN computer may act as a backup or default source if the CMS computer is not available to provide a recommended content source. In some embodiments, the fallback request may be sent automatically if a condition is satisfied.

At 418, the method 400 may include determining whether the digital content item was downloaded from the CDN computer. If the digital content item was downloaded from the CDN computer, then the method 400 moves to 420. Otherwise, the method 400 moves to 422.

At 420, the method 400 may include sending to the CMS computer via the computer network a report indicating that the CDN computer did respond to the request to download the digital content item, and the digital content item was successfully downloaded. The report may include telemetry data associated with the requesting peer computer as well as telemetry data associated with CDN computer.

At 422, the method 400 may include sending to the CMS computer via the computer network a report indicating that the CDN computer did not respond to the request to download the digital content item. The report may include telemetry data associated with the requesting peer computer and the CDN computer (e.g., an indication that the CDN computer did not respond to the request).

At 424, the method 400 may include automatically sending to a peer computer of the P2P network via the computer network a second fallback request to download the digital content item. The fallback request may be sent to a non-optimized peer computer or a peer computer that has not been recommended by the CMS computer. The fallback request may be a default measure to acquire the digital content item. In some embodiments, the fallback request may be sent automatically if a condition is satisfied.

By initially querying the CMS computer for a source to provide a digital content item, a peer computer may receive a recommendation for a peer computer that may be matched or may be best fit with the peer computer to provide the digital content item. Furthermore, by automatically requesting the digital content item from the CDN computer as a first fallback, the peer computer may be able to acquire the digital content item even when the CMS computer is unavailable.

Figure 6:
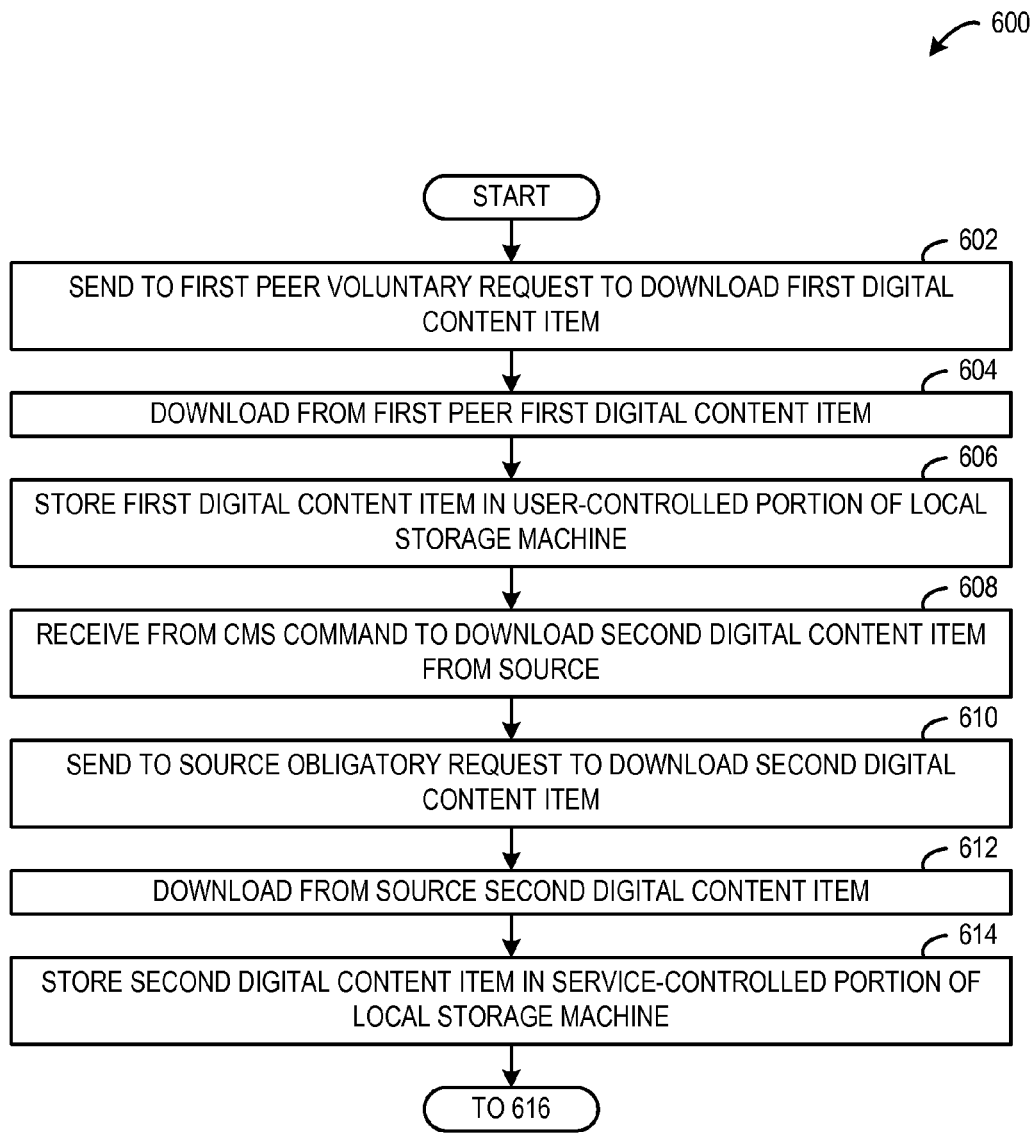
FIGS. 6 and 7 show a method for performing voluntarily operations and performing obligatorily operations in a P2P network according to an embodiment of the present disclosure.
Figure 7:
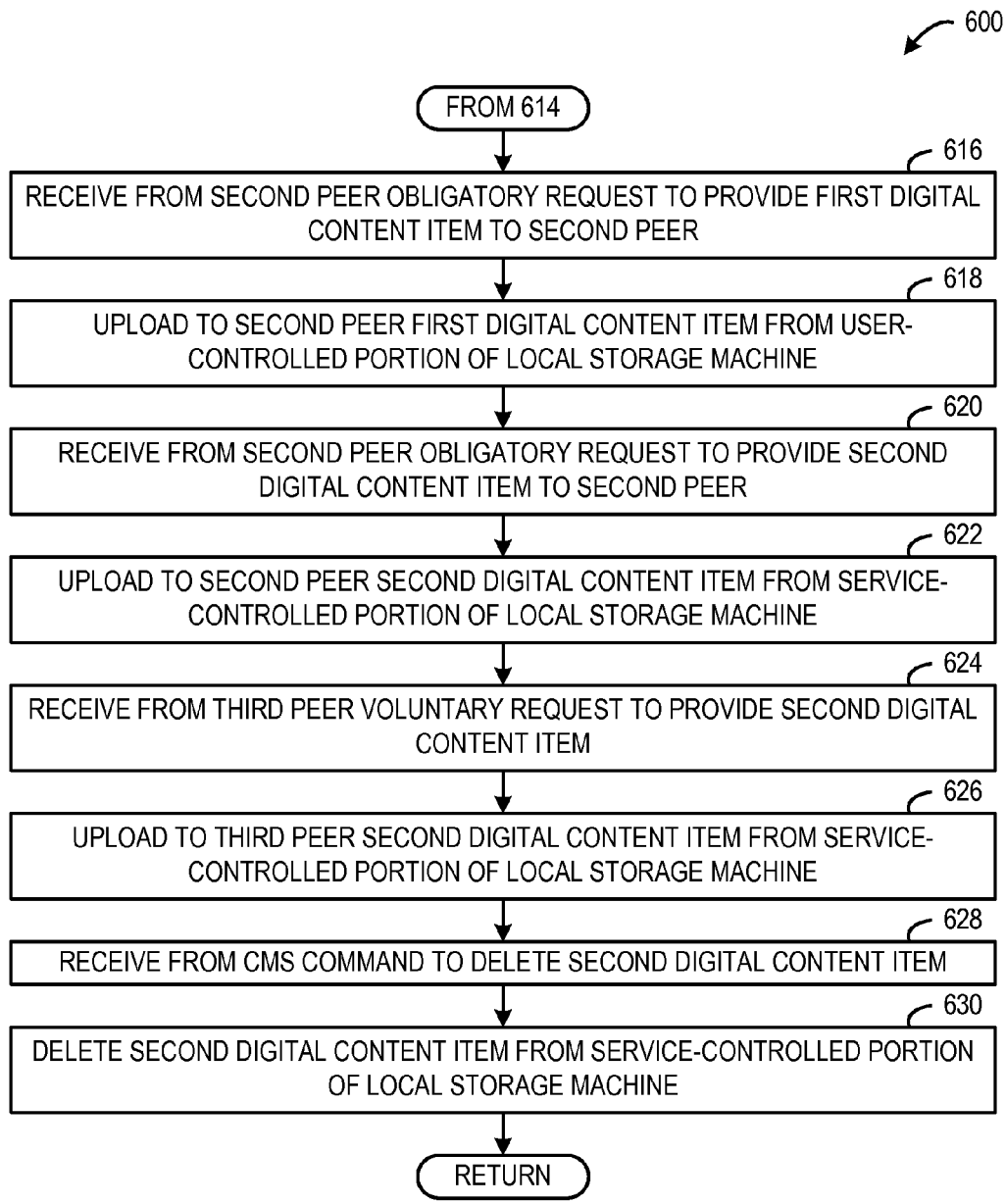

FIGS. 6 and 7 show a method 600 for performing voluntarily operations and performing obligatorily operations in a P2P network according to an embodiment of the present disclosure. For example, the method 600 may be performed by a peer computer of a P2P network, such as the peer computer 101 of the P2P network 102 shown in FIG. 1.

In the below described method, a peer computer of a P2P network managed by a CMS computer may include a local storage machine that includes a user-controlled portion and a service-controlled portion. The peer computer may voluntarily download digital content items to the user-controlled portion and voluntarily upload digital content items from either the user-controlled portion or the service-controlled portion. Further, the peer computer may obligatorily download digital content items to the service-controlled portion, upload digital content items from the service-controlled portion, and delete digital content items from the service-controlled portion based on commands received from the CMS computer. In embodiments that employ a PULL transfer strategy, a commanded upload from the service-controlled portion may take the form of the CMS computer commanding another peer computer to send to the peer computer acting as the virtual distribution hub a request to provide a digital content item from the service-controlled portion to the requesting peer computer. In other words, the peer computer may act as both a virtual distribution hub controlled by the CMS computer and a stand-alone peer of the P2P network. In some embodiments, a service-controlled portion may only be formed and utilized if a peer opts in to participating as a virtual distribution hub controlled by the CMS computer. In some embodiments, the peer may be compensated (e.g., granted access to digital content, preferred downloading, monetary items, redeemable items, etc.) for use of the service-controlled portion of the local storage machine, dedicated bandwidth, and/or another suitable resources. In some embodiments, the peer may be granted participation in the P2P network in exchange for used of such resources.

At 602, the method 600 may include sending to a first peer computer of a P2P network via a computer network a voluntary request to download a first digital content item.

At 604, the method 600 may include voluntarily downloading from the first peer computer via the computer network the first digital content item.

At 606, the method 600 may include storing the first digital content item in a user-controlled portion of a local storage machine.

At 608, the method 600 may include receiving from a CMS computer via a computer network a command to download from a source a second digital content item. In some cases, the source may be another peer computer. In some cases, the source may be a CDN computer.

At 610, the method 600 may include sending to the source via the computer network an obligatory request to download the second digital content item.

At 612, the method 600 may include obligatorily downloading from the source via the computer network the second digital content item.

At 614, the method 600 may include storing the second digital content item in a service-controlled portion of a local storage machine.

At 616, the method 600 may include receiving from a second peer computer via the computer network an obligatory request to provide the first digital content item. The request may be obligatory because the request may be sent by the second peer computer in response to receiving a command from the CMS computer.

At, 618, the method 600 may include obligatorily uploading from the user-controlled portion of the local storage machine to the second peer computer via the computer network the first digital content item.

At 620, the method 600 may include receiving from the second peer computer via the computer network an obligatory request to provide the second digital content item. The request may be obligatory because the request may be sent by the second peer computer in response to receiving a command from the CMS computer.

At, 622, the method 600 may include obligatorily uploading from the service-controlled portion of the local storage machine to the second peer computer via the computer network the second digital content item. It will be appreciated that the CMS computer may command transfer of digital content items that may be stored in either the user-controlled portion or the service-controlled portion.

At 624, the method 600 may include receiving from a third peer computer via the computer network a voluntary request to provide the second digital content item. The request may be voluntary because the request may be sent by the third peer computer without being commanded by the CMS computer.

At 626, the method 600 may include voluntarily uploading from the service-controlled portion of the local storage machine to the third peer computer via the computer network the second digital content item.

At 628, the method 600 may include receiving from the CMS computer via the computer network a command to delete the second digital content item.

At 630, the method 600 may include obligatorily deleting the second digital content item from the service-controlled portion of the local storage machine.

Figure 8:
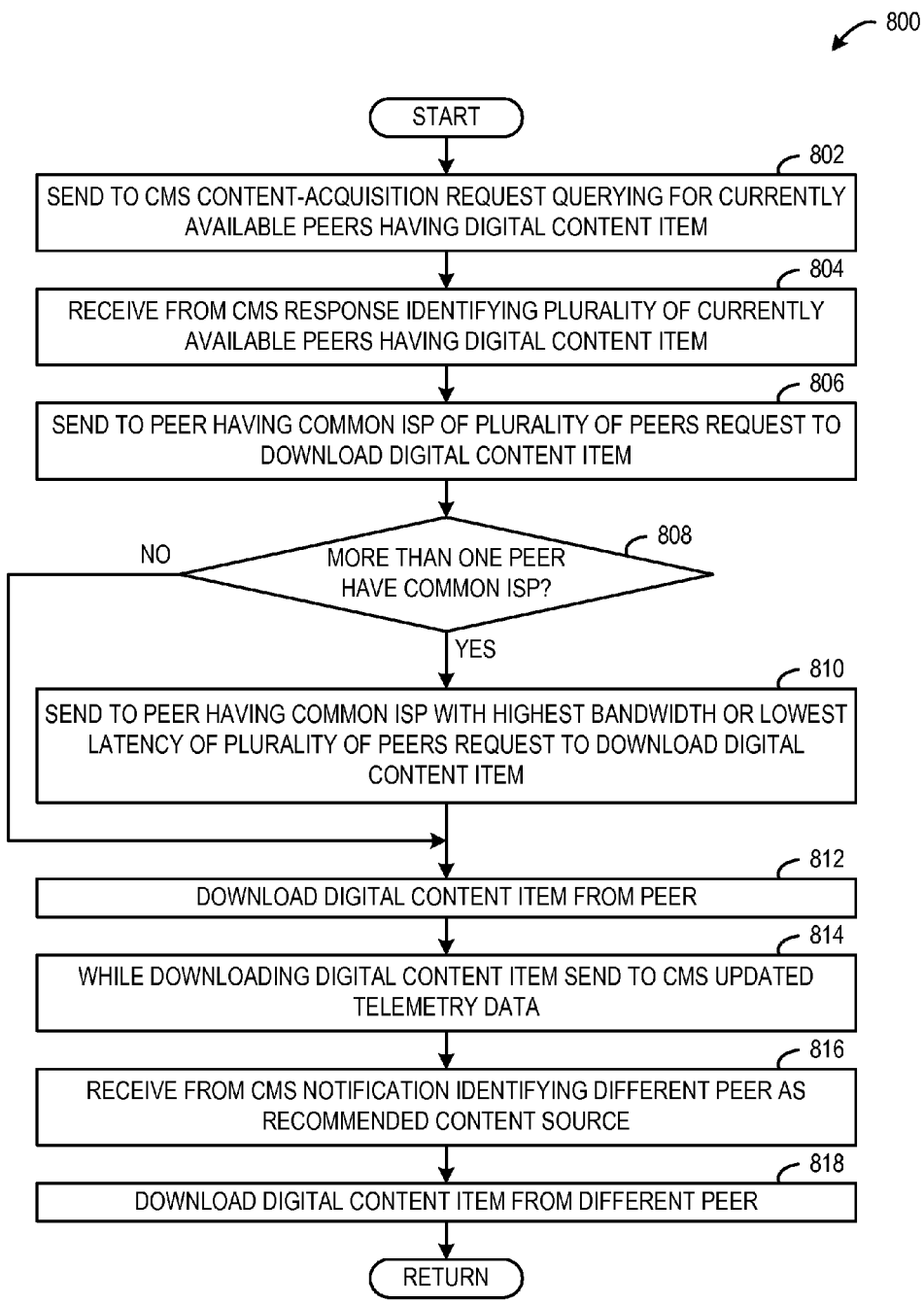
FIG. 8 shows a method for selecting a peer computer as a content source according to an embodiment of the present disclosure.

FIG. 8 shows a method 800 for selecting a peer computer as a content source according to an embodiment of the present disclosure. For example, the method 800 may be performed by a peer computer of a P2P network, such as the peer computer 101 of the P2P network 102 shown in FIG. 1. At 802, the method 800 may include sending to a CMS computer via a computer network a content-acquisition request. The content-acquisition request may query the CMS computer for currently available peer computers of a P2P network that have a digital content item.

At 804, the method 800 may include receiving from the CMS computer via the computer network a response to the content-acquisition request identifying a plurality of peer computers. For example, the plurality of peer computers may be selected, prioritized, or ordering based on selection metrics described herein.

At 806, the method 800 may include sending to a peer computer having a common ISP of the plurality of peer computers via the computer network a request to download the digital content item.

At 808, the method 800 may include determining whether more than one peer computer has the common ISP of the plurality of peer computers. If more than one peer computer of the plurality of peer computers has the common ISP, then the method 800 moves to 810. Otherwise, the method 800 moves to 812.

At 810, the method 800 may include sending to a peer computer having a highest bandwidth or a lowest latency that have the common ISP of the plurality of peer computers via the computer network a request to download the digital content item. In some cases, the highest bandwidth or the lowest latency may be a highest current bandwidth or a lowest current latency. In some cases, the highest bandwidth or the lowest latency may be a highest historical bandwidth or a lowest historical latency. In some cases, a peer computer having one or more of a highest current bandwidth, a lowest current latency, a highest historical bandwidth, or a lowest historical latency, that is connected to the intranet network, and has the common ISP of the plurality of peer computers is sent a request via the computer network to download the first digital content item. It will be appreciated that this criteria may be mixed, matched, or considered in any suitable manner to make an informed decision on selecting a peer to send the request At 812, the method 800 may include downloading the digital content item from the peer computer.

At 814, the method 800 may include while downloading the digital content item from the peer computer, sending to the CMS computer via the computer network updated telemetry data. In some cases, a peer computer may send telemetry data to the CMS computer other than during transfer of a digital content item. It is to be understood that the timing of sending telemetry data need not be tied to the timing of transferring a digital content item.

At 816, the method 800 may include receiving from the CMS computer via the computer network, a notification identifying a different peer computer of the P2P network that has the digital content item as the recommended content source. In some cases, the CMS computer may select the different peer based on updated telemetry data received from the peer computer during transfer of the digital content item. In some cases, the CMS computer may select the different peer based on telemetry data related to other conditions, such as activity within the P2P network.

At 818, the method 800 may include downloading the digital content item from the different peer computer via the computer network.

By selecting as a content source a peer computer that shares an ISP over other peer computers that do not share the ISP, a probability of selecting a peer computer having a high throughput as the content source may be increased. Further, if two peer computers have the same ISP; then in many cases, transfer of the digital content item may not count towards a peer computers transfer capacity or throughput. Accordingly, a cost to transfer the digital content item may be reduced. Furthermore, peer selection may be updated dynamically during transfer of a digital content item as conditions change.

Figure 9:
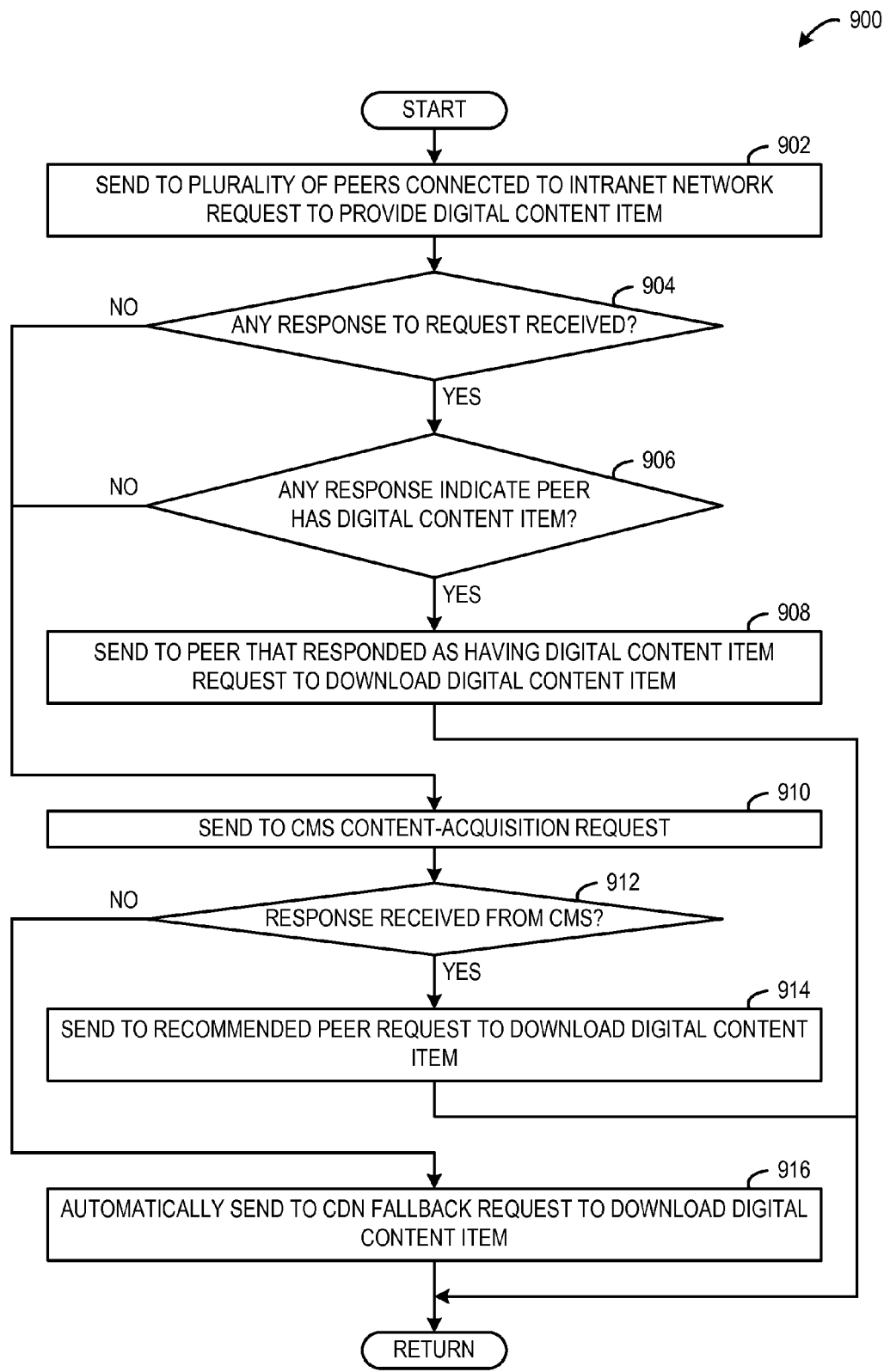
FIG. 9 shows a method for selecting a peer computer as a content source according to another embodiment of the present disclosure.

FIG. 9 shows a method 900 for selecting a peer computer as a content source according to another embodiment of the present disclosure. For example, the method 900 may be performed by a peer computer of a P2P network, such as the peer computer 101 of the P2P network 102 shown in FIG. 1. At 902, the method 900 may include sending to a plurality of peer computers identified as being connected to an intranet network a request to provide a digital content item. Such a request may be sent prior to submitting a content-acquisition request to the CMS, for example.

At 904, the method 900 may include determining if any response to the request is received from a peer computer that is connected to the intranet network. If a response is received from a peer computer that is connected to the intranet network, then the method 900 moves to 906. Otherwise the method moves to 910.

At 906, the method may include determining if any response indicates the peer computer has the digital content item. If any response indicates that a peer computer has the digital content item, then the method moves to 908. Otherwise, the method 900 moves to 910.

At 908, the method 900 may include sending to the peer computer that responded as having the digital content item a request to download the digital content item. In this way, the digital content item may be obtained purely within the intranet network.

At 910, the method 900 may include if no response received from a peer computer connected to the intranet network indicates that the peer computer has the digital content item, sending to a CMS computer via a computer network a content-acquisition request. The content-acquisition request may query the CMS computer for a recommended content source to provide the digital content item.

At 912, the method 900 may include determining if a response to the content-acquisition request is received from the CMS computer. If a response is received, then the method 900 moves to 914. Otherwise, the method 900 moves to 916.

At 914, the method 900 may include if a response to the content-acquisition request is received via the computer network and identifies a recommended peer computer of a P2P network as the recommended content source, sending to the recommended peer computer via the computer network a request to download the digital content item. In some embodiments, the CMS computer may select a source as the recommended content source based on having a common ISP with the peer computer.

At 916, the method may include if a response to the content-acquisition request is not received, automatically sending to the CDN computer via the computer network a fallback request to download the digital content item. In some embodiments, the fallback request may be sent automatically if a condition is satisfied. For example, the condition may include not receiving a response to the content-acquisition request within a designated response time limit, not beginning to download the digital content item within a designated download-commencement time limit, not completing download of the digital content item within a designated download-completion time limit, not downloading the digital content item above a threshold throughput, or not downloading the digital content item above a threshold throughput during a download testing period. It will be appreciated that any suitable algorithm or logic may be implemented to make an informed decision about whether or when to use network or corporate resources (e.g., CDN computer) to provide the digital content item without departing from the scope of the present disclosure.

By selecting as a content source a peer computer that is connected to an intranet network over peer computers that are not connected to the intranet network, the digital content item may be transferred without accessing an external computer network, such as the Internet. Accordingly, a cost to transfer the digital content item may be reduced, and the digital content item may be transferred using less resources of the P2P network.

Figure 10:
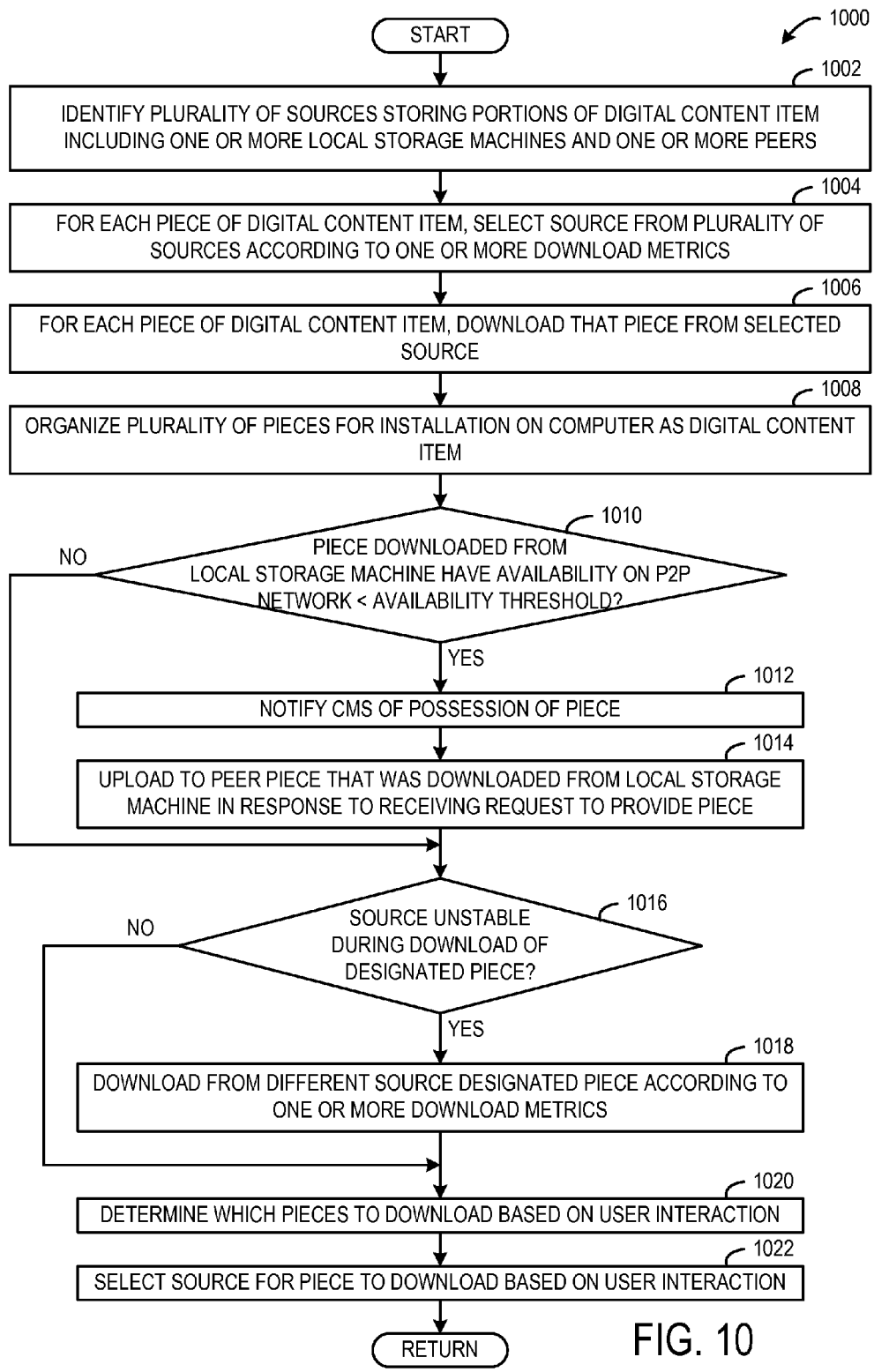
FIG. 10 shows a method for managing a P2P network according to an embodiment of the present disclosure.

FIG. 10 shows a method 1000 for selecting one or more content sources to provide a digital content item according to an embodiment of the present disclosure. For example, the method 1000 may be performed by a peer computer of a P2P network, such as the peer computer 101 of the P2P network 102 shown in FIG. 1. At 1002, the method 1000 includes identifying a plurality of sources storing portions of a digital content item that includes a plurality of pieces. In some cases, a portion of a digital content item may include a piece of the digital content item. In some cases, a portion of a digital content item may include some pieces of the digital content item. In some cases, a portion of a digital content item may include an entirety of the digital content item. The plurality of sources may include one or more local storage machines of a computer (e.g., the peer computer 101) and one or more peer computers of a P2P network (e.g., the P2P network 102).

At 1004, the method 1000 may include for each piece of the plurality of pieces of the digital content item, selecting a source from the plurality of sources according to one or more download metrics. For example, the download metrics may include a fastest download speed, a lowest acquisition cost, a lowest resource usage level, a lowest energy usage level, a lowest user experience disruption level, an availability of a resource, and/or any other suitable metric. Further, in some cases, the download metric may select the one or more local storage machines over the P2P network when possible to download a piece of the digital content item.

In one example, in a basic form, selection of an acquisition source may be based on a single download metric. For example, the download metric may be to get the portion as quickly as possible, in which case other factors such as acquisition cost would not be considered when selecting the source.

In another example, in a more elaborate form, selection of an acquisition source may balance a plurality of competing (or possibly conflicting) download metrics. For example, a plurality of download metrics may include 30% weight associated with acquisition cost and a 70% weight associated with acquisition speed. Any suitable heuristics may be used without departing from the scope of this disclosure.

In some embodiments, the download metrics may further specify which pieces of a digital content item are to be downloaded by which sources. For example, a plurality of download metrics may specify that 30% of the digital content item is to be downloaded from a fast and reliable source that is more costly, such as a CDN computer, and 70% of the digital content item is to be downloaded from, a slower, less reliable, and less costly computer, such a peer computer on a public P2P network.

In some embodiments, the download metrics may dynamically change during the download process, such that a priority changes. For example, during download of a digital content item where the download metrics prioritize acquisition speed over acquisition cost, conditions may change (e.g., run out of money) and the download metrics may dynamically adjust such that acquisition cost may be prioritized over acquisition speed. In some cases, a different source may be dynamically selected based on the change in download metrics.

At 1006, the method 1000 may include for each piece of the plurality of pieces of the digital content item, downloading that piece from a selected source. In some cases, downloading may include transferring data from one local storage machine to another local storage machine (e.g., loading content from removable media to hard drive or solid state memory). In some cases, downloading may include transferring data from a remote computer via a computer network. In some cases, different pieces of the digital content item may be downloaded from different sources in parallel. Further, in some cases, at least some pieces of the digital content item may be downloaded from the one or more local storage machines and at least some pieces of the digital content item may be downloaded from one or more peer computers of the P2P network via a computer network. In other words, portions of the digital content item may be downloaded locally and remotely.

At 1008, the method 1000 may include organizing the plurality of pieces for installation on the computer as the digital content item. For example, organizing may include validating pieces by comparing a unique identifier of a downloaded piece against a unique identifier of a requested piece. In some cases, different pieces may be downloaded from different sources having different protocols. Accordingly, organizing may include converting all pieces of the digital content item to a uniform format. Further, organizing may include arranging downloaded pieces in a specified order to form the digital content item.

At 1010, the method 1000 may include determining whether a piece of the digital content item downloaded from the one or more local storage machines has an availability that is below a threshold availability of the P2P network. In some cases, the threshold availability may include the piece of the digital content item not being available on any peer computer of the P2P network. In some cases, the threshold availability may include the piece of the digital content item not being available on any available peer computer of the P2P network that is otherwise available to provide a digital content item. If the piece has an availability that is below the threshold availability, the method 1000 moves to 1012. Otherwise, the method 1000 moves to 1016.

At 1012, the method 1000 may include sending to a CMS computer via a computer network a notification indicating possession of the piece of the digital content item that was downloaded from the one or more local storage machines. The notification may be sent because the availability of the piece is below the threshold availability of the P2P network.

At 1014, the method 1000 may include uploading to a peer computer of the P2P network via the computer network the piece of the digital content item in response to receiving a request from the peer computer of the peer-to-peer network via the computer network to provide the piece of the digital content item. In some cases, the request may be sent voluntarily by the peer computer. In some cases, the request may be sent obligatorily by the peer computer in response to receiving a command from the CMS computer to retrieve the piece of the digital content item. In either case, the piece of the digital content item may be distributed to the P2P network to increase the availability of the piece in the P2P network.

At 1016, the method 1000 may include determining whether a source is stable while downloading a designated piece of the digital content item. For example, a source may be determined to be stable or unstable according to one or more stability metrics. If the source is determined to be unstable, then the method 1000 moves to 1018. Otherwise, the method 1000 moves to 1020.

At 1018, the method may include downloading from a different source the designated piece. The different source may be selected from the plurality of sources according to the one or more download metrics.

In some embodiments, portions of the digital content item may be installed or executed before an entirety of the digital content item is downloaded. For example, different portions of a game may be downloaded based on a user's progress through the game, such as a location, map, level, direction, etc. Accordingly, at 1020, the method may include determining which pieces of the digital content item to download based on user interaction with the digital content item. For example, pieces representing a location in a game world proximate to a current location of a user may be downloaded prior to a location in the game world that is more remote from the current location of the user.

At 1022, the method 1000 may include selecting the source for a piece of the digital content item based on user interaction with the digital content item. For example, pieces of the digital content item that are more likely to be installed or consumed in the near future may be downloaded from a faster, more expensive source and pieces that are less likely to be installed or consumed in the near future may be downloaded from a slower, less expensive source.

The above described method may be performed by a peer computer to download a digital content item from one or more sources in an efficient manner that potentially increases the health of a P2P network. In particular, by introducing an interaction between local sources and sources of the P2P network, all sources can work cooperatively to get the pieces of the digital content item in a favorable order while eliminating duplication piece acquisition, and increasing the health of the P2P network by offloading transfer of some pieces to local sources.

Figure 11:
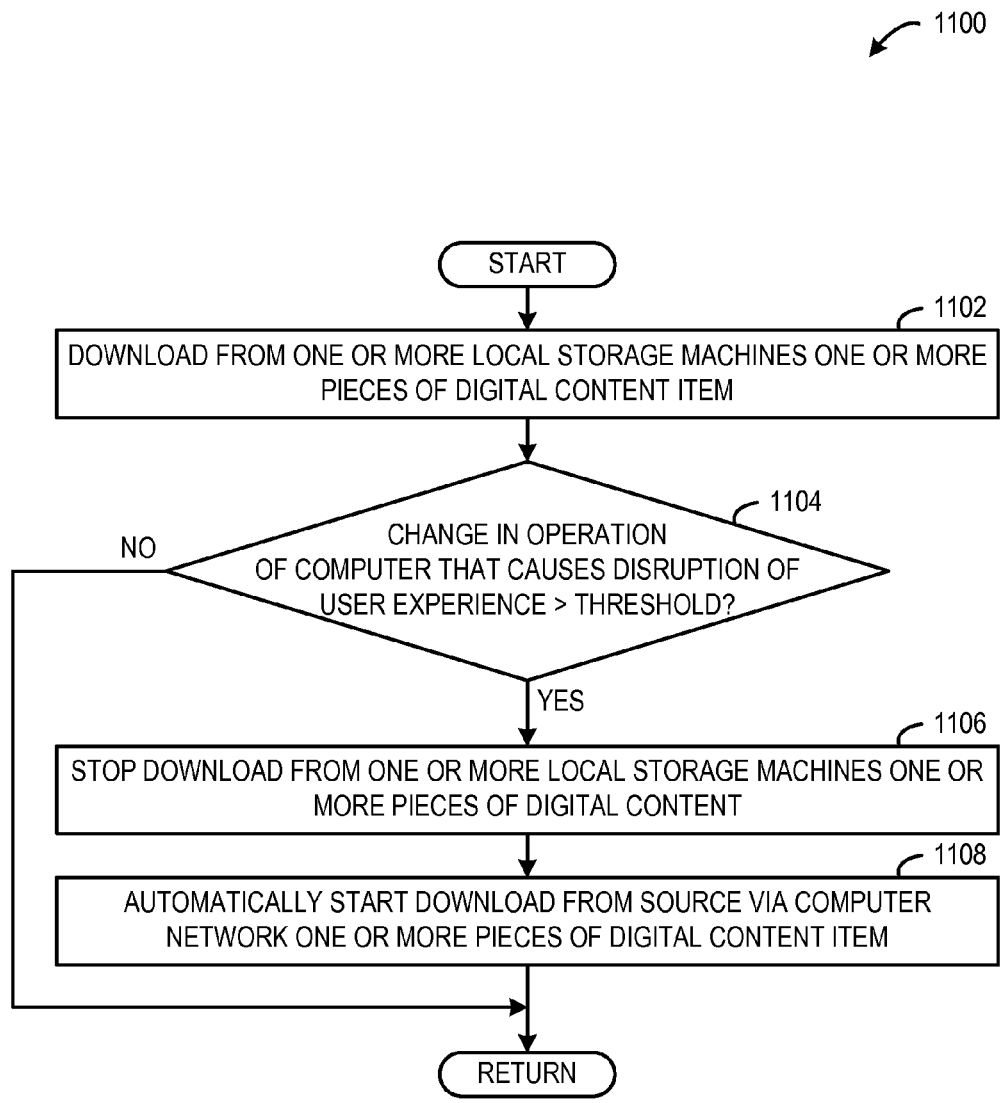
FIG. 11 shows a method for downloading content according to an embodiment of the present disclosure.

FIG. 11 shows a method 1100 for downloading content according to an embodiment of the present disclosure. For example, the method 1100 may be performed by a peer computer of a P2P network, such as the peer computer 101 of the P2P network 102 shown in FIG. 1.

At 1102, the method 1100 may include downloading from one or more local storage machines of a computer one or more pieces of a digital content item.

At 1104, the method 1100 may include determining whether a change in operation of the computer that causes a disruption of a user experience above a threshold disruption level occurs. For example, the threshold disruption level may include a resource usage level of the computer being greater than a threshold level. In one particular example, a change in operation may include a user executing a program, playing a game, watching a video, etc. that consumes resources. Such a change in operation may cause the resource usage level to be greater than a threshold level, such as a level at which a game or video may stutter, skip, buffer or pause. Note this is merely one example and other disruptions of a user experience may be considered without departing from the scope of the present disclosure. If a change occurs that causes a disruption of the user experience above the threshold disruption level, then the method 1100 moves to 1106. Otherwise, the method 1100 returns to other operations.

At 1106, the method 1100 may include in response to a change in operation of the computer that causes a disruption of a user experience above the threshold disruption level, stopping download from the one or more local storage machines of the computer the one or more pieces of the digital content item.

At 1108, the method 1100 includes responsive to stopping download from the one or more storage machines, automatically starting download from a source via a computer network the one or more pieces of the digital content item. The source may be selected from a plurality of sources according to one or more download metrics. For example, the one or more download metrics may include a fastest download speed, a lowest acquisition cost, a lowest resource usage level, a lowest energy usage level, a lowest user experience disruption level, and/or other suitable metrics. In one example, the plurality of sources may include one or more peer computers of a P2P network and a CDN computer.

By dynamically stopping download of a digital content item from a local source and automatically downloading the digital content item from a remote source via a computer network in response to encountering a user disruption, the user experience may be prioritized over acquisition of the digital content item, and the digital content item may still be acquired.

Figure 12:
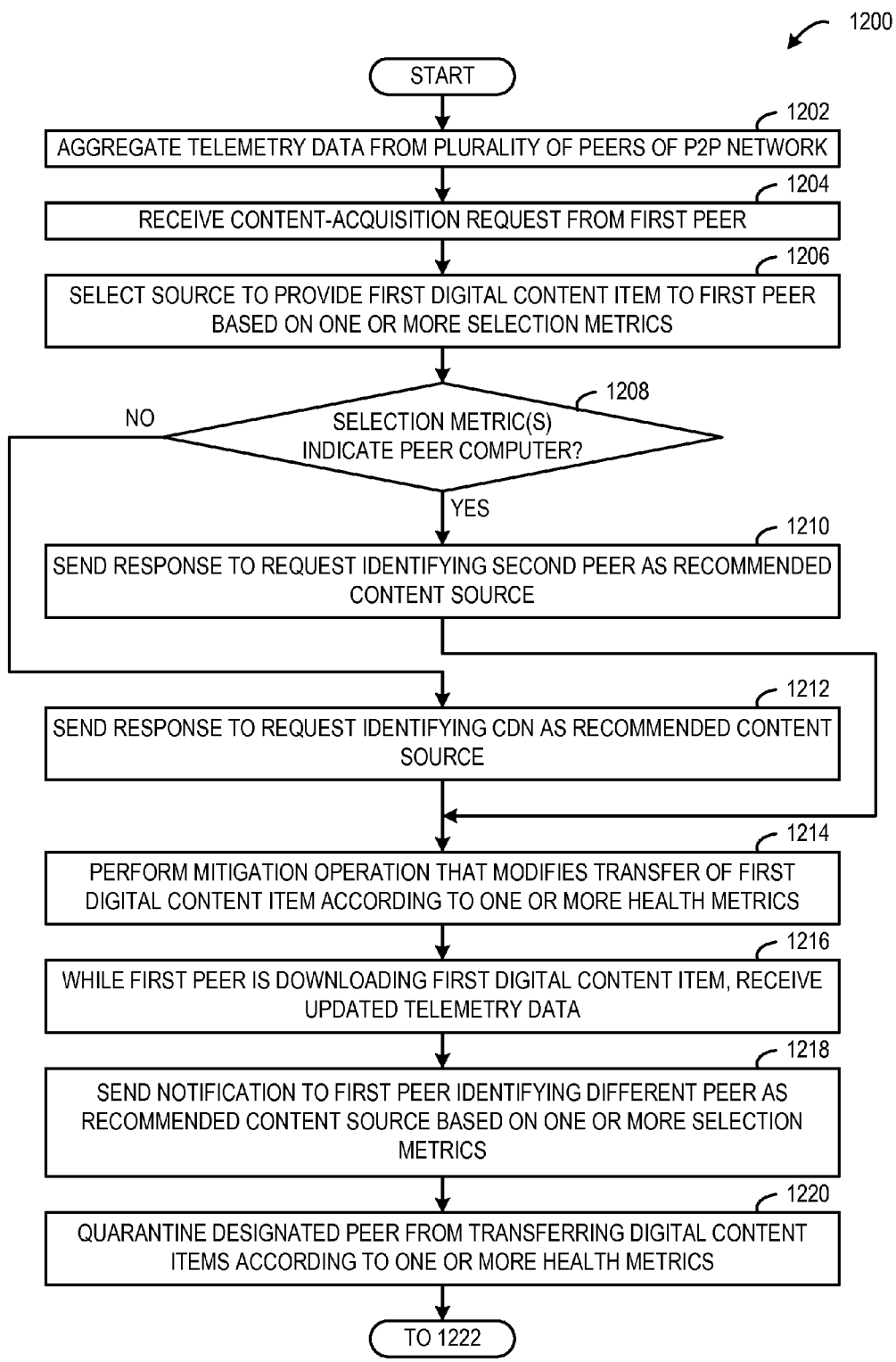
FIGS. 12 and 13 show a method for managing a P2P network according to an embodiment of the present disclosure.
Figure 13:
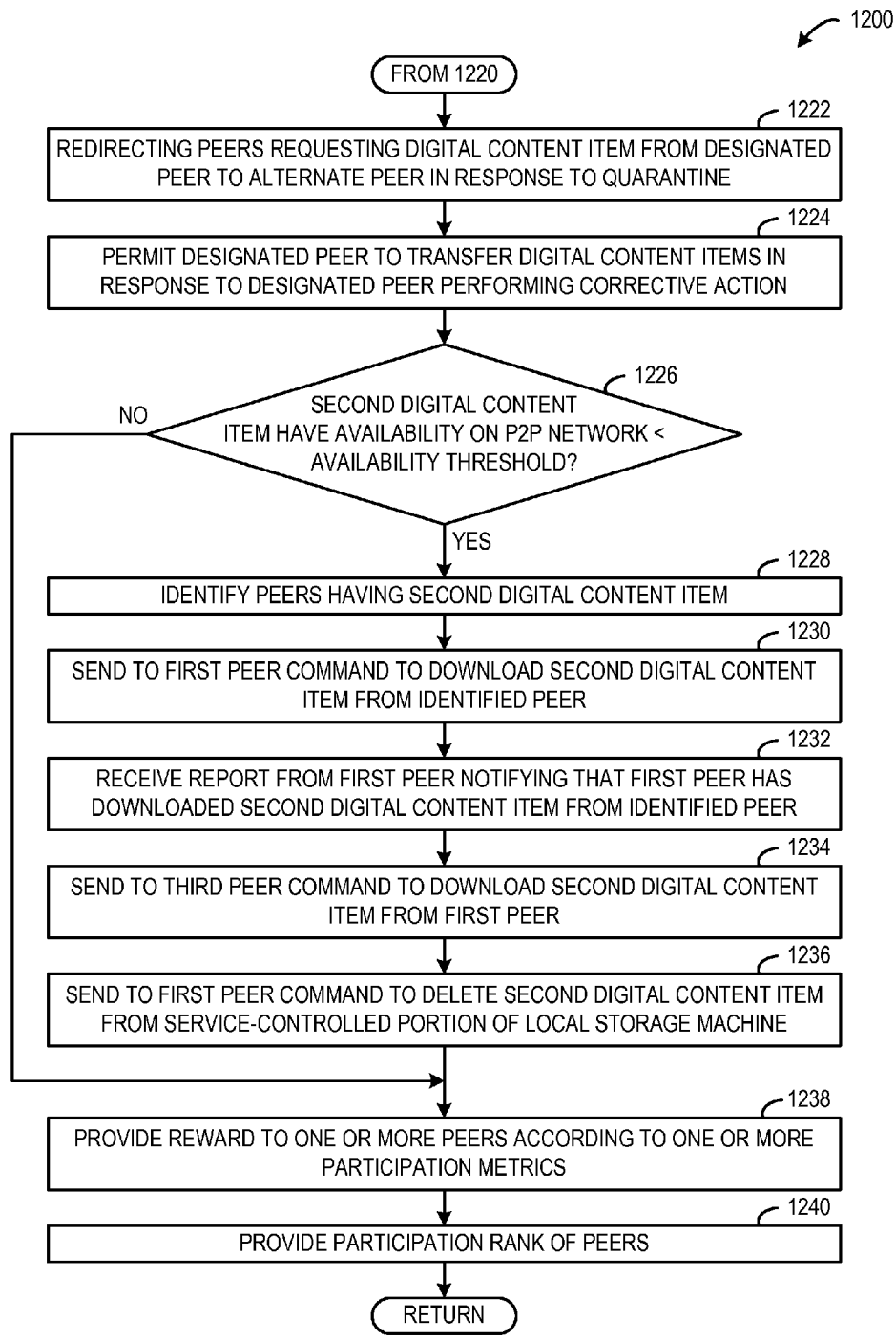

FIGS. 12 and 13 show a method 1200 for managing a P2P network according to an embodiment of the present disclosure. For example, the method 1200 may be performed by a CMS computer of a P2P network, such as the CMS computer 110 of the P2P network 102 shown in FIG. 1. At 1202, the method 800 may include aggregating telemetry data from a plurality of peer computers in a P2P network via a computer network.

At 1204, the method 1200 may include receiving from a first peer computer of the P2P network via the computer network a content-acquisition request querying for a recommended content source to provide a first digital content item.

At 1206, the method 1200 may include selecting a source to provide the first digital content item to the first peer computer based on a selection metric derived from the aggregated telemetry data. For example the determination may consider whether the telemetry data aggregated from the plurality of peer computers indicates the first digital content item is available for upload from any peer computer of the P2P network. In some embodiments, the determination may further consider if a peer computer that has the digital content item is a best fit for the first peer computer based on one or more selection metrics. In some cases, the determination may further consider the type of content being requested when selecting a recommended content source.

At 1208, the method 1200 may include determining whether the recommended content source is a peer computer or a CDN network based on the one or more selection metrics. If the recommended content source is a peer computer, then the method 1200 moves to 1210. Otherwise, the method 1200 moves to 1212.

At 1210, the method 1200 may include sending to the first peer computer via the computer network a response to the content-acquisition request identifying a second peer computer that has the first digital content item as the recommended content source.

At 1212, the method 1200 may include sending to the first peer computer via the computer network a response to the content-acquisition request identifying the CDN computer as the recommended content source.

At 1214, the method 1200 may include performing a mitigation operation that modifies transfer of a digital content item between peer computers of the P2P network according to one or more health metrics of the P2P network derived from the telemetry data aggregated from the plurality of peer computers.

At 1216, the method 1200 may include while the first peer computer is downloading the first digital content item from the second peer computer, receiving updated telemetry data from the first peer computer, the second peer computer, or both peer computers.

At 1218, the method 1200 may include sending to the first peer computer via the computer network a notification identifying a different peer computer of the P2P network that has the first digital content item as the recommended content source. The different peer computer may be selected according to the peer selection metric derived from the telemetry data including the updated telemetry data.

At 1220, the method 1200 may include quarantining a designated peer computer from transferring a digital content item within the P2P network according to one or more health metrics of the P2P network derived from the telemetry data aggregated from the plurality of peer computers.

At 1222, the method 1200 may include redirecting a peer computer requesting a digital content item from the designated peer computer that is quarantined to an alternate peer computer having the digital content item in response to the designated peer computer being quarantined.

At 1224, the method 1200 may include permitting the designated peer computer that is quarantined to transfer a digital content item within the P2P network after being quarantined in response to the designated peer computer performing a corrective action. In other words, lifting the quarantine of the designated peer computer. Non-limiting examples of corrective actions may include increasing bandwidth, increasing availability, increasing stability, removing a compromised digital content item, etc.

Note in some embodiments, the mitigation operation may include dynamically recommending a different source to provide a digital content item, quarantining a peer computer, and lifting quarantine of a peer computer, as well as other suitable operations discussed herein.

At 1226, the method 1200 may include determining whether an availability of a second digital content item is below a threshold availability of the P2P network. If the second digital content item is below the threshold availability, then the method 1200 moves to 1228. Otherwise, the method 1200 moves to 1238.

At 1228, the method 1200 may include identifying peer computers of the P2P network that have the second digital content item. In some cases, the second digital item may have been voluntarily downloaded by a peer computer and saved in a user-controlled portion of a local storage machine of that peer computer. In some cases, the second digital content item may have been obligatorily downloaded by a peer computer based on a command from a CMS computer and saved in a service-controlled portion of a local storage machine of that peer computer.

At 1230, the method may include sending to the first peer computer via the computer network a command to download the second digital content item from a source (e.g., a peer computer identified as having the first digital content item). The source may be selected according to one or more selection metrics. The second digital content item may be saved in a user-controlled portion of a local storage machine of the first peer computer. In some embodiments, the method may include sending to a peer computer of the P2P network identified as having the second digital content item via the computer network a command to upload the second digital content item to the first peer computer. In other words, the CMS computer may be configured to command uploading or downloading of a digital content item according to a configuration of the content distribution system.

In some embodiments, the method may include sending to peer computers of the P2P network that do not have the second digital content item commands to download the second digital content item until the availability of the second digital content item is above the threshold availability.

At 1232, the method 1200 may include receiving from the first peer computer via the computer network a report indicating that the first peer computer has downloaded the second digital content item from the source. The second digital content item may be downloaded by the first peer computer obligatorily and saved in a service-controlled portion of a local storage machine of the first peer computer.

At 1234, the method 1200 may include sending to a third peer computer of the P2P network via the computer network a command to download the second digital content item from the first peer computer. The command may be sent as part of a management operation to increase the availability of the second digital content item in the P2P network.

At 1236, the method 1200 may include sending to the first peer computer via the computer network a command to delete the second digital content item from the first peer computer from the service-controlled portion of the local storage machine of the first peer computer.

At 1238, the method 1200 may include providing a reward to one or more peer computers of the P2P network according to one or more participation metrics of the P2P network derived from the telemetry data aggregated from the plurality of peer computers.

In one example, the reward may include assigning a participation rank to the peer.

Figure 15:
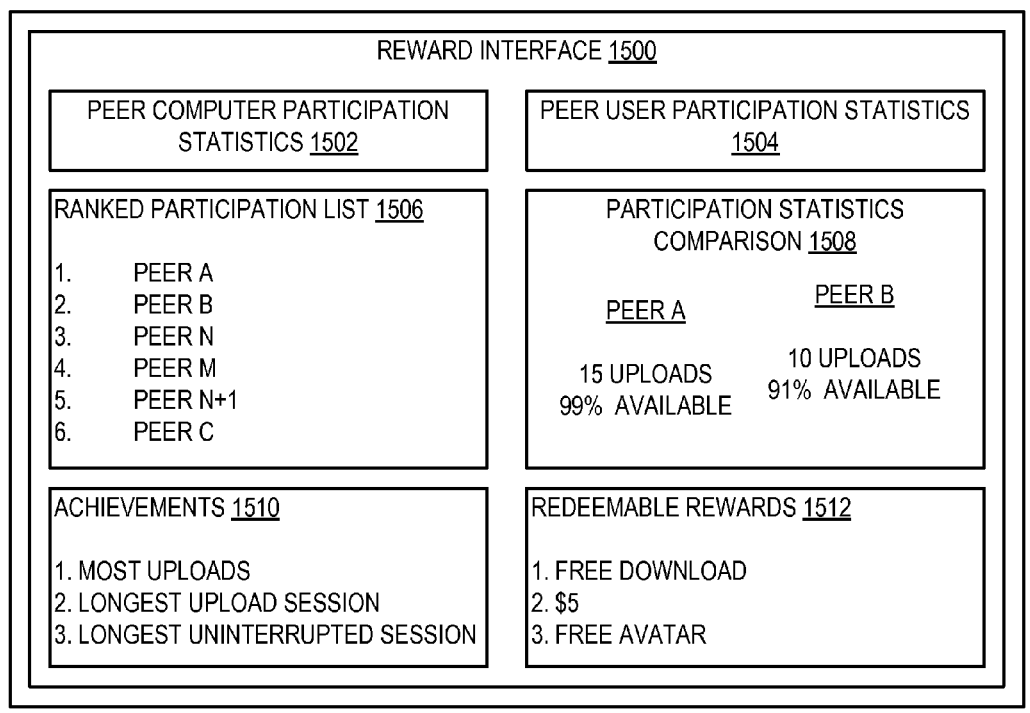
FIG. 15 shows a reward interface displayable to a user according to an embodiment of the present disclosure.

Accordingly, at 1240, the method 1200 may include providing a participation rank of peer computers of the P2P network. For example providing may include displaying a list of peer computers of the P2P network ordered by the participation rank of each peer computer. An example of the list is shown in FIG. 15 and described in further detail below. The list may provide an incentive for a peer computer to participate in transferring content throughout the P2P network to increase their ranking. Meanwhile, the health of the P2P network may be improved through the increase in availability of digital content items. In other examples, the participation ranks of peer computers may be provided in a table, a hierarchical display, such as by region, or the like. It will be appreciated that the participation rank of peer computers may be provided in any suitable manner without departing from the scope of the present disclosure.

By aggregating telemetry data from peer computers of the P2P network and performing operations based on metrics derived from the aggregate telemetry data, efficiency of operation and overall health of peer computers as well as a part or whole of the P2P network may be increased.

Figure 14:
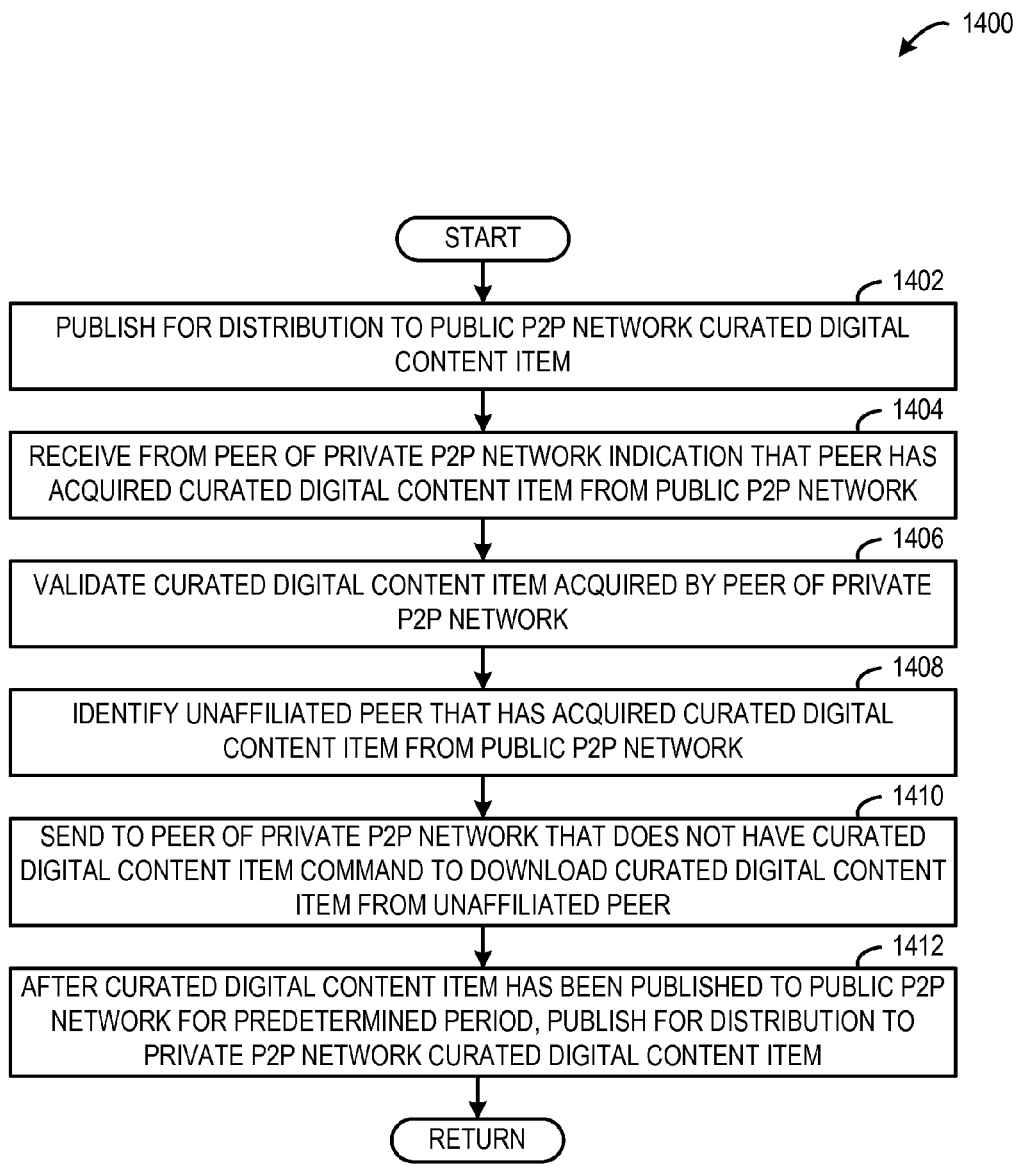
FIG. 14 shows a method for distributing content according to an embodiment of the present disclosure.

FIG. 14 shows a method 1400 for distributing content according to an embodiment of the present disclosure. For example, the method 1400 may be performed by a CMS computer of a P2P network, such as the CMS computer 110 of the P2P network 102 shown in FIG. 1. At 1402, the method 1400 may include publishing for distribution to a public P2P network via a computer network a curated digital content item. In some cases, the curated digital content item may be published by the CMS computer of the private P2P network.

At 1404, the method 1400 may include receiving from a peer computer of a private P2P network via the computer network an indication that the peer computer has acquired the curated digital content item from the public P2P network.

At 1406, the method 1400 may include validating the curated digital content item that has been acquired by the peer computer of the private P2P network.

At 1408, the method 1400 may include identifying an unaffiliated peer computer that has acquired the curated digital content item from the public P2P network. The unaffiliated peer computer may not be affiliated with the private P2P network. In some cases, the unaffiliated peer computer may be a member of the public P2P network, since the public P2P network may not require any affiliation.

At 1410, the method 1400 may include sending to a peer computer of the private P2P network that does not have the curated digital content item via the computer network a command to download the curated digital content from the unaffiliated peer computer.

At 1412, the method 1400 may include, after the curated digital content item has been published to the public P2P network for a predetermined period, publishing for distribution to the private P2P network via the computer network the curated digital content item.

By publishing the curated digital content to the public P2P network, the resources of the public P2P network may be leveraged to distribute and otherwise increase the availability of the curated digital content item. Further, when the curated digital content item is introduced to the private P2P network, the curated digital content item may be validated to ensure that it is suitable for distribution in the private P2P network. Accordingly, the availability of the curated content may be increased quickly, while reducing the load on a private P2P network.

It is to be understood that the various actions, operations, or functions of the methods described above may be performed in the sequence illustrated, in parallel, or in some cases omitted. Furthermore, the above described methods may be combined in any suitable manner. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used.

FIG. 15 shows a reward interface 1500 displayable to a user according to an embodiment of the present disclosure. In some embodiments, the reward interface may be generated by the CMS computer 110 shown in FIG. 1. In some embodiments, the reward interface may be generated by the peer computer 101 shown in FIG. 1. In some embodiments, the reward interface may be rendered by a third party with access to peer reward information. The reward interface 1500 may be a graphical user interface that displays information related to participation in a P2P network as well as rewards accrued based on participation in the P2P network.

The reward interface 1500 may include peer computer participation statistics 1502 that may be collected over time as a peer computer interacts in a P2P network. The participation statistics may include seeding statistics and leeching statistics. Other non-limiting examples of participation statistics may include pieces of content seeded, pieces of content leeched, number of bytes seeded, number of bytes leeched, total minutes seeded, total minutes leeched, longest uninterrupted seeding session with a peer, most pieces of a file seeded, number of files solely seeded, number of pieces of a game that have been seeded, number of times a game has been fully seeded, etc. In some embodiments, the peer computer participation statistics may be listed according to participation by content categories (e.g., content type, title, genre, and/or family).

The reward interface 1500 may include peer user participation statistics 1504. The peer user participation statistics may be similar to the peer computer participation statistics except that they may be tied to a user that may use a plurality of different peer computers.

The reward interface 1500 may include a participation list or leader board 1506 that lists peer computers according a participation rank of each peer computer in a P2P network. The participation rank may be assigned according to one or more participation metrics derived from telemetry data. In some embodiments, the leader board may describe highly ranked peer computers including highlighting particular participation statistics.

The reward interface 1500 may include a comparison of peer participation statistics 1508. The comparison may allow a user to gauge their participation level compared to other peer computers of the P2P network.

The reward interface 1500 may include rewards that are provided to a peer computer. For example, the reward interface 1500 may include achievements 1510 that a peer computer has earned through participation in a P2P network, such as most uploads, longest upload session, and longest uninterrupted session. The achievements 1510 may be varied or progressively more difficult as the peer computer is rewarded with greater achievements. The reward interface 1500 may include redeemable rewards 1512. For example, the redeemable rewards may include redeemable items, coupons, points, or a monetary reward. The rewards may further include prestige (e.g., title, ranking, etc.) or any other suitable prize.

The reward interface and related reward mechanisms may create a competitive environment between participants of a P2P network to seed digital content items that ultimately increase the seed population of the P2P network. In this way, friendly competition between peers may lead to an overall healthier P2P network.

In some embodiments, the methods and processes described herein may be tied to a computing system of one or more computing devices. In particular, such methods and processes may be implemented as a computer-application program or service, an application-programming interface (API), a library, and/or other computer-program product.

Figure 16:
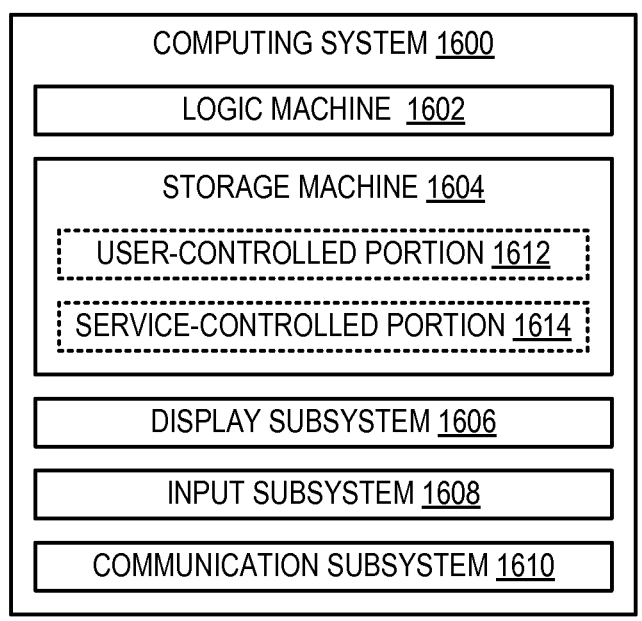
FIG. 16 shows a computer system according to an embodiment of the present disclosure.

FIG. 16 schematically shows a non-limiting embodiment of a computing system 1600 that can enact one or more of the methods and processes described above.

Computing system 1600 is shown in simplified form. Computing system 1600 may take the form of one or more game consoles, personal computers, server computers, tablet computers, home-entertainment computers, network computing devices, mobile computing devices, mobile communication devices (e.g., smart phone), and/or other computing devices. In some embodiments, the computing system 1600 may be representative of a peer computer, such as peer computer 101 shown in FIG. 1. In some embodiments, the computing system 1600 may be representative of CMS computer 110 shown in FIG. 1. In some embodiments, the computing system 1600 may implement the computer architecture of CMS computer 300 shown in FIG. 3. In some embodiments, the computing system 1600 may be representative of a CDN computer, such as CDN computer 114 shown in FIG. 1.

The computing system 1600 includes a logic machine 1602 and a storage machine 1604. The computing system 1600 may optionally include a display subsystem 1606, an input subsystem 1608, a communication subsystem 1610, and/or other components not shown in FIG. 16.

The logic machine 1602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

The storage machine 1604 includes one or more physical devices configured to hold instructions executable by the logic machine to implement the methods and processes described herein. When such methods and processes are implemented, the state of the storage machine 1604 may be transformed—e.g., to hold different data.

The storage machine 1604 may include removable and/or built-in devices. The storage machine 1604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The storage machine 1604 may include volatile, nonvolatile, dynamic, static, read/write, read-only, random-access, sequential-access, location-addressable, file-addressable, and/or content-addressable devices.

In cases where the computer system 1600 is representative of a peer computer, the storage machine 1604 may include a plurality of local storage machines that may store various portions of digital content items, and the computer system may be configured to select from which local storage machine or another peer computer to download pieces of a digital content item according to one or more download metrics. For example, a piece of a digital content item may be stored on local storage machines including optical memory and semiconductor memory as well as available for download from a peer computer of a P2P network, and the computer system 1600 may be configured to select a source for the digital content item from one of these sources based on the download metric, such as which source can deliver the digital content item the fastest. Note this merely one example and may variations may be performed without departing from the scope of the present disclosure.

Furthermore, in cases where the computer system 1600 is representative of a peer computer, the storage machine 1604 may include a user-controlled portion 1612 of the storage machine 1604 and a service-controlled portion 1614 of the storage machine 1604. The user-controlled portion 1612 may be configured to store digital content items voluntarily downloaded by the peer computer. The service-controlled portion 1614 may be configured to store digital content items obligatorily downloaded by the peer computer, such as by command of the CMS computer.

In some embodiments, the CMS computer may command the peer computer to provide a digital content item from the user-controlled portion 1612 or the service-controlled portion 1614. In some embodiments, the peer computer may be configured to not have a right to access directly digital content items stored in the service-controlled portion 1614 (e.g., data is encrypted and requires authorization and/or authentication to decrypt). In some embodiments, the peer computer may be configured to have access to and use digital content item stored in the service-controlled portion 1614. In some embodiments, a peer computer may not be aware of digital content items to which they are obligatorily hosting or seeding. In some embodiments, a peer computer may allocate the service-controlled portion 1614 of the local storage machine to participate in the P2P network. In some embodiments, a peer computer may allocate a portion of bandwidth to obligatory hosting or seeding to participate in the P2P network. In some embodiments, a peer may opt-in or opt-out of designating a portion of the local storage machine as a service-controlled portion. In some embodiments, a peer may be compensated in exchange for opting in to designating a portion of the local storage machine as a service-controlled portion. In some embodiments, some but not all peer computers in a P2P network may have a service-controlled portion. In some embodiments, all peer computers in a P2P network may have a service-controlled portion. In some embodiments, the service-controlled portion may be a fraction of a size of the user-controlled portion. Although it is to be understood that the service-controlled portion and the user-controlled portion may be any suitable portion of the local storage machine without departing from the scope of the present disclosure.

It will be appreciated that the storage machine 1604 includes one or more physical devices. However, aspects of the instructions described herein alternatively may be propagated by a communication medium (e.g., an electromagnetic signal, an optical signal, etc.) that is not held by a physical device for a finite duration.

Aspects of the logic machine 1602 and the storage machine 1604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

It will be appreciated that a "service", as used herein, is an application program executable across multiple user sessions. A service may be available to one or more system components, programs, and/or other services. In some implementations, a service may run on one or more server-computing devices.

When included, the display subsystem 1606 may be used to present a visual representation of data held by the storage machine 1604. This visual representation may take the form of a graphical user interface (GUI). As the herein described methods and processes change the data held by the storage machine, and thus transform the state of the storage machine, the state of the display subsystem 1606 may likewise be transformed to visually represent changes in the underlying data. The display subsystem 1606 may include one or more display devices utilizing virtually any type of technology. Such display devices may be combined with the logic machine 1602 and/or the storage machine 1604 in a shared enclosure, or such display devices may be peripheral display devices.

When included, the input subsystem 1608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, the communication subsystem 1610 may be configured to communicatively couple the computing system 1600 with one or more other computing devices. The communication subsystem 1610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow the computing system 1600 to send and/or receive messages to and/or from other devices via a computer network such as an intranet or the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. It will be understood that the terms "first," "second," and "third," etc. are used merely as labels, and are not intended to impose numerical, sequential, or spatial requirements on their objects.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method comprising:
   at a centralized management service computer, aggregating telemetry data directly from each of a plurality of peer computers of a peer-to-peer network via a computer network, wherein each of the plurality of peer computers sends to the centralized management service computer telemetry data related to transfer of a digital content item within the peer-to-peer network; and
   at the centralized management service computer, performing a mitigation operation that modifies transfer of a digital content item between peer computers of the peer-to-peer network according to one or more health metrics of the peer-to-peer network derived from the telemetry data aggregated by the centralized management service computer from the plurality of peer computers, wherein all mitigation operations are performed by the centralized management service computer such that individual peer computers of the peer-to-peer network are not responsible for mitigation operations.

2. The method of claim 1, wherein the one or more health metrics includes a threshold number of peer computers requesting a digital content item from a designated peer computer, and the mitigation operation includes redirecting one or more peer computers requesting the digital content item from the designated peer computer to request the digital content item from a different peer computer in order to reduce a number of requesting peer computers of the designated peer computer below the threshold number.

3. The method of claim 1, wherein the one or more health metrics includes a threshold throughput of a region of the peer-to-peer network, and the mitigation operation includes redirecting one or more peer computers requesting a digital content item from one or more peer computers in the region to request the digital content item from a different peer computer outside of the region in order to increase a throughput of the region above the threshold throughput.

4. The method of claim 1, wherein the one or more health metrics includes a threshold difference between a number of uploads and a number of downloads of a peer computer of the peer-to-peer network, and the mitigation operation includes reducing the number of downloads in order to increase a difference between a number of uploads and a number of downloads of the peer computer above the threshold difference.

5. The method of claim 1, wherein the one or more health metrics includes a threshold availability of a digital content item, and the mitigation operation includes commanding one or more peer computers having the digital content item to upload the digital content item to one or more other peer computers in the peer-to-peer network in order to increase an availability of the digital content item above the threshold availability.

6. The method of claim 1, further comprising:
providing a reward to one or more peer computers of the peer-to-peer network according to one or more participation metrics of the peer-to-peer network derived from the telemetry data aggregated from the plurality of peer computers.

7. The method of claim 6, wherein the one or more participation metrics include one or more of a number of pieces of a digital content item uploaded to other peer computers in the peer-to-peer network by a peer computer, a number of bytes uploaded to other peer computers in the peer-to-peer network by a peer computer, a total amount of time spent uploading to other peer computers in the peer-to-peer network by a peer computer, a longest session spent uploading to other peer computers in the peer-to-peer network by a peer computer, a longest amount of time spent available for uploading to other peer computers in the peer-to-peer network, a total amount of time spent available for uploading to other peer computers in the peer-to-peer network, a number of times a piece of a digital content item is uploaded to other peer computers in the peer-to-peer network by a peer computer, and a number of times an entire digital content item is uploaded to other peer computers in the peer-to-peer network by a peer computer.

8. The method of claim 6, wherein the reward is a participation rank assigned according to the one or more participation metrics, and the method further comprises:
providing a participation ranking of peer computers of the peer-to-peer network.

9. The method of claim 6, wherein the reward includes one or more of a title, an achievement, a redeemable item, access to a digital content item, or a monetary item.

\* \* \* \* \*